United States Patent [19]

Nakano

[11] Patent Number: 4,852,041
[45] Date of Patent: Jul. 25, 1989

[54] INTERFACE CONVERTER

[75] Inventor: Tsuyoshi Nakano, Tokyo, Japan

[73] Assignee: Micro Co., Ltd.

[21] Appl. No.: 899,302

[22] PCT Filed: Dec. 16, 1985

[86] PCT No.: PCT/JP85/00686

§ 371 Date: Aug. 1, 1986

§ 102(e) Date: Aug. 1, 1986

[87] PCT Pub. No.: WO86/03914

PCT Pub. Date: Jul. 3, 1986

[30] Foreign Application Priority Data

| Dec. 17, 1984 | [JP] | Japan | 59-189997[U] |
|---|---|---|---|
| Jan. 16, 1985 | [JP] | Japan | 60-002959[U] |
| Jan. 21, 1985 | [JP] | Japan | 60-005438[U] |
| Mar. 12, 1985 | [JP] | Japan | 60-034236[U] |
| Mar. 29, 1985 | [JP] | Japan | 60-063315 |
| Apr. 12, 1985 | [JP] | Japan | 60-076819 |

[51] Int. Cl.$^4$ .............. G06F 11/00; G06F 13/42; H04L 23/00
[52] U.S. Cl. .............. 364/900; 375/121
[58] Field of Search ... 364/200 MS File, 900 MS File, 364/900; 340/825.57, 825.16; 375/36; 379/93; 178/63 R

[56] References Cited

U.S. PATENT DOCUMENTS

| 4,322,794 | 3/1982 | Kurakake | 364/200 |
|---|---|---|---|
| 4,355,354 | 10/1982 | Kempf et al. | 364/200 |
| 4,403,111 | 9/1983 | Kelly | 178/63 R |
| 4,443,864 | 4/1984 | McEnroy | 364/900 |
| 4,535,421 | 8/1985 | Duwell et al. | 364/900 |
| 4,589,106 | 5/1986 | Prather et al. | 370/60 |
| 4,607,170 | 8/1986 | Wickman | 375/36 |
| 4,607,379 | 8/1986 | Marshall, Jr. et al. | 375/36 |
| 4,631,698 | 12/1986 | Walsh et al. | 340/825.16 |
| 4,637,011 | 1/1987 | Crabbe, Jr. | 375/7 |
| 4,637,012 | 1/1987 | Crabbe, Jr. | 375/7 |
| 4,639,727 | 1/1987 | Blasius et al. | 340/825.57 |
| 4,677,646 | 6/1987 | Dodds et al. | 375/36 |
| 4,685,124 | 8/1987 | Smitt et al. | 379/93 |
| 4,686,506 | 8/1987 | Farago | 340/347 DD |

FOREIGN PATENT DOCUMENTS

| 0027736 | 2/1980 | Japan | 375/36 |
|---|---|---|---|
| 56-53224 | 5/1981 | Japan | . |
| 56-74729 | 6/1981 | Japan | . |
| 58-124352 | 7/1983 | Japan | 375/36 |
| 58-171157 | 10/1983 | Japan | . |
| 59-16443 | 1/1984 | Japan | . |
| 0191955 | 10/1984 | Japan | 375/36 |
| 60-14547 | 1/1985 | Japan | 375/36 |
| 60-236534 | 11/1985 | Japan | 375/36 |
| 0236547 | 11/1985 | Japan | 375/7 |

OTHER PUBLICATIONS

IBM Technical Disclosure, "RS-232 and RS-422 Converter for an IBM Personal Computer", 11/85, vol. 28, No. 6, pp. 2551-2552.

Primary Examiner—Gareth D. Shaw
Assistant Examiner—Viet Q. Nguyen
Attorney, Agent, or Firm—Toren, McGeady & Associates

[57] ABSTRACT

An interface converter for mutually converting between a first serial interface, such as RS-232-C interface, and a second serial interface, such as RS-422-A interface. The interface converter includes a second connector being connectable directly to a first connector attached to the first serial interface and a plurality of third connectors, each of which has a terminal arrangement matched to the second serial interface. The interface converter further includes a first receiving circuit for the first serial interface connected to the second connector, a first transmitting circuit for the second serial interface interconnecting the first receiving circuit with the third connectors, a second receiving circuit for the second serial interface connected to the third connectors, and a second transmitting circuit for the first serial interface interconnecting the second receiving circuit with the second connector. The first transmitting circuit and the second receiving circuit are controlled by control lines from the second connector via the first receiving circuit.

19 Claims, 22 Drawing Sheets

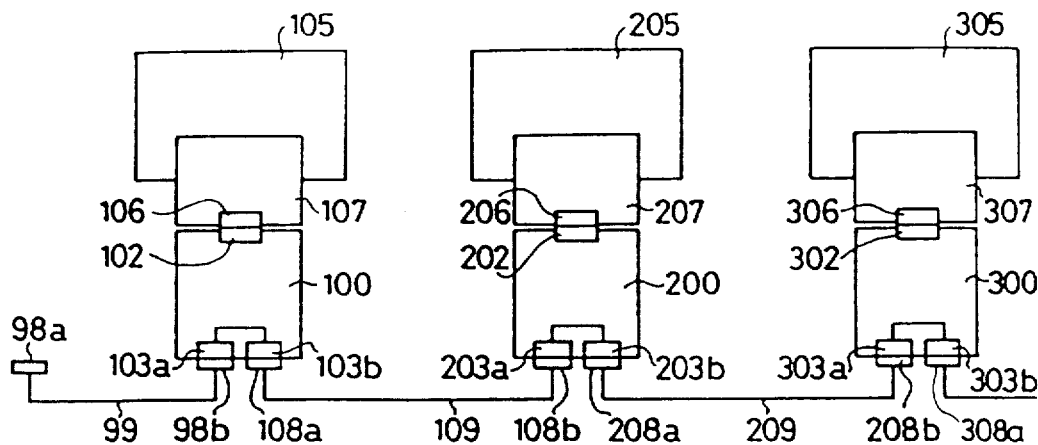
F I G. 1
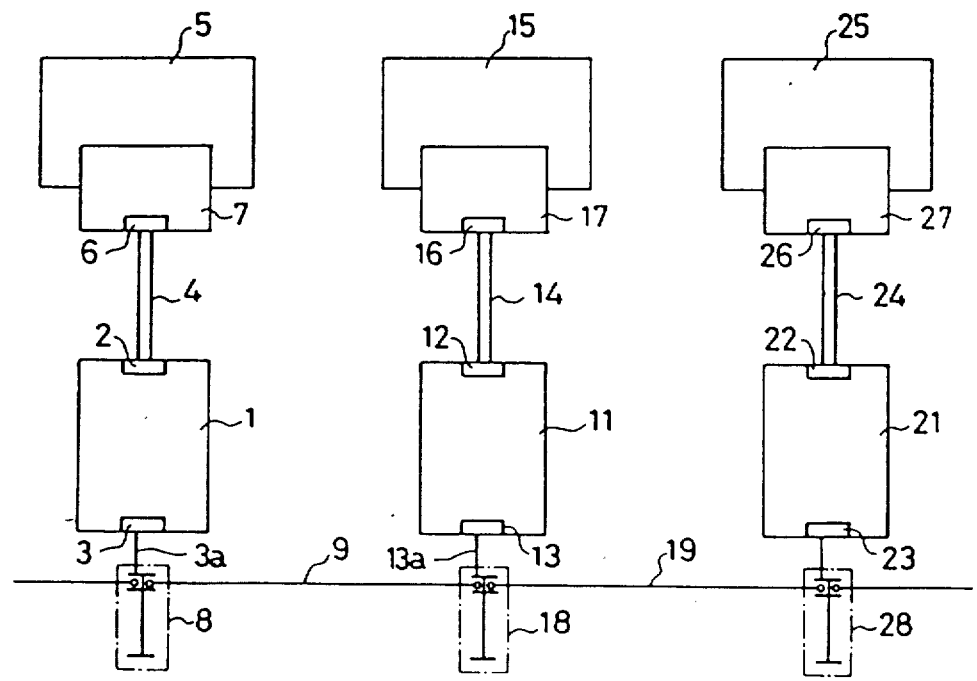
F I G. 25

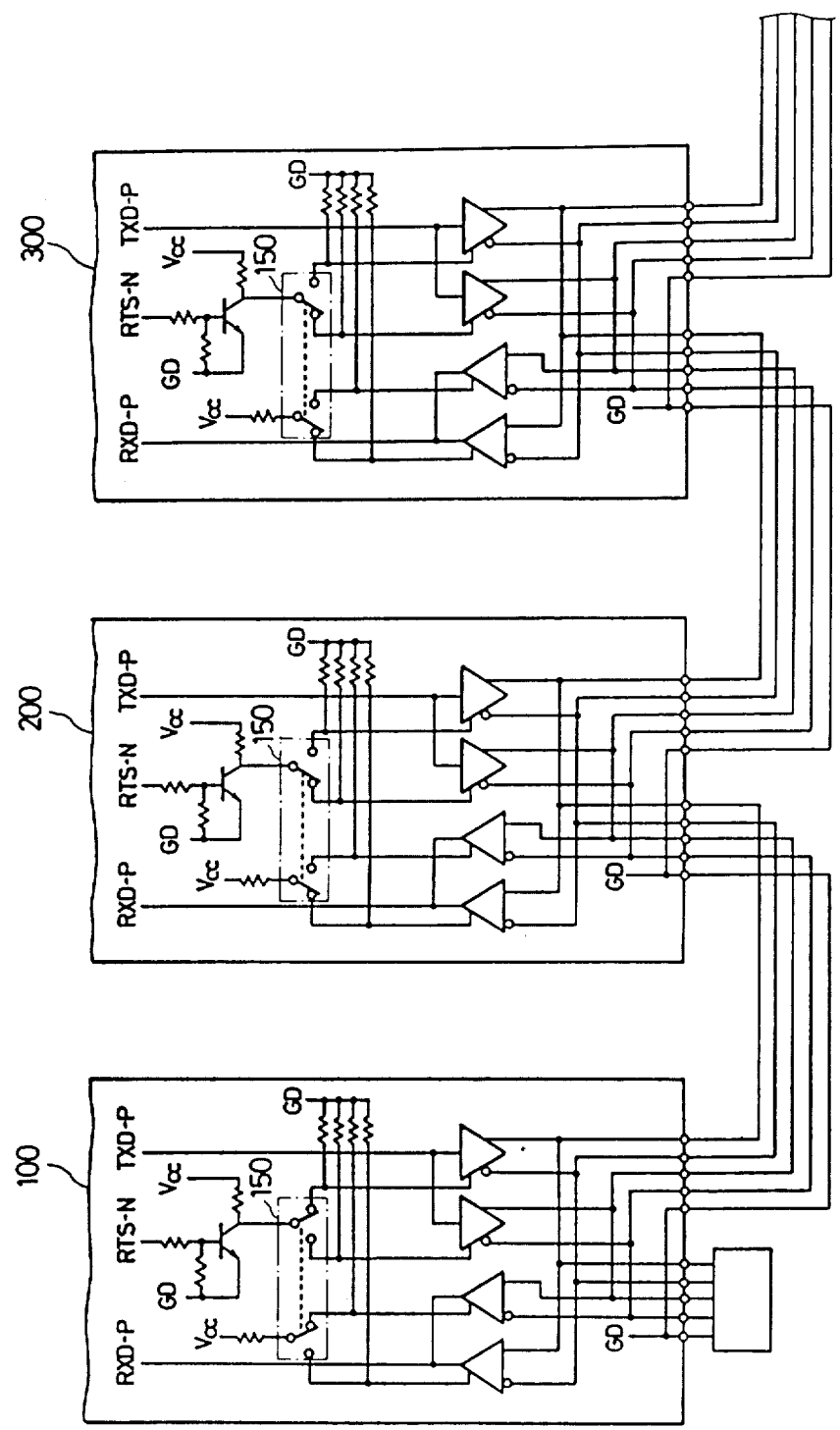
F I G. 7

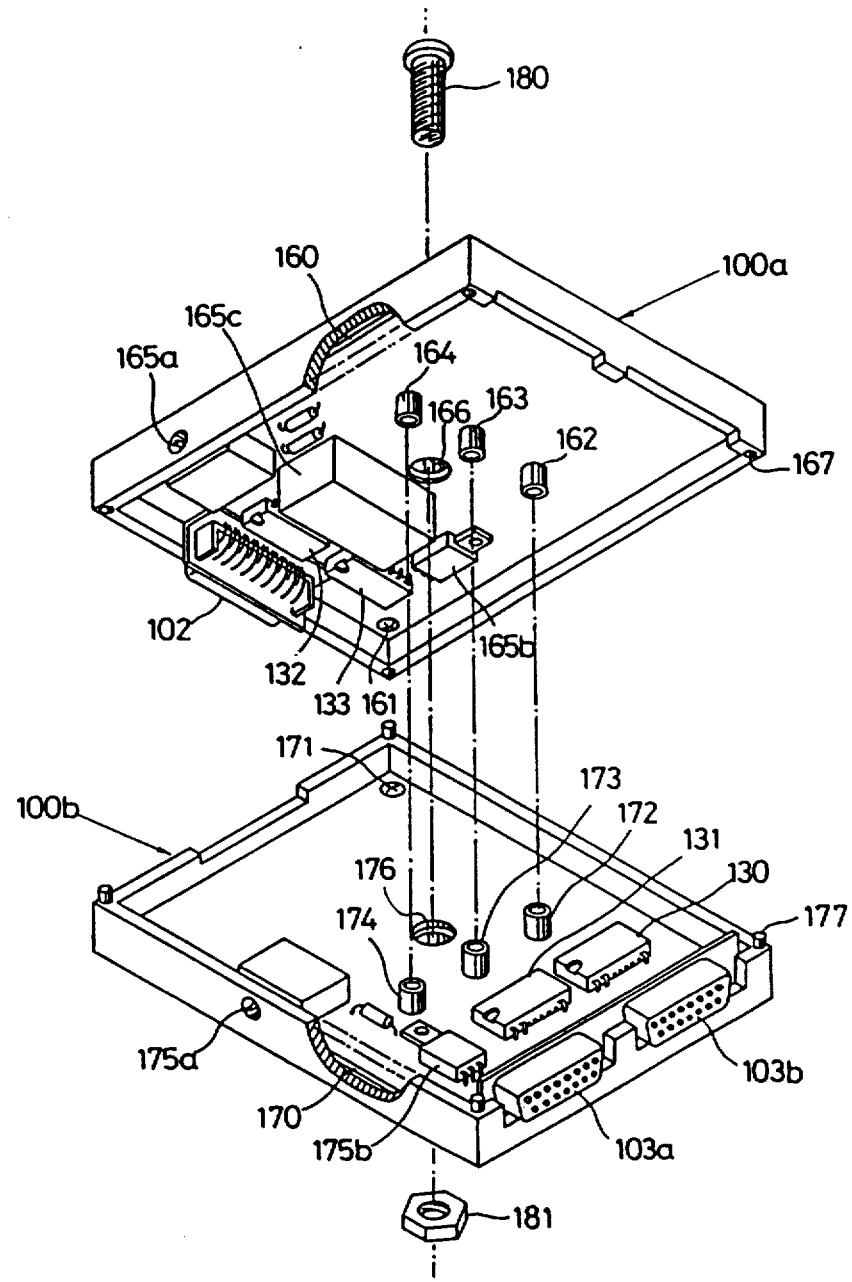
F I G. 11

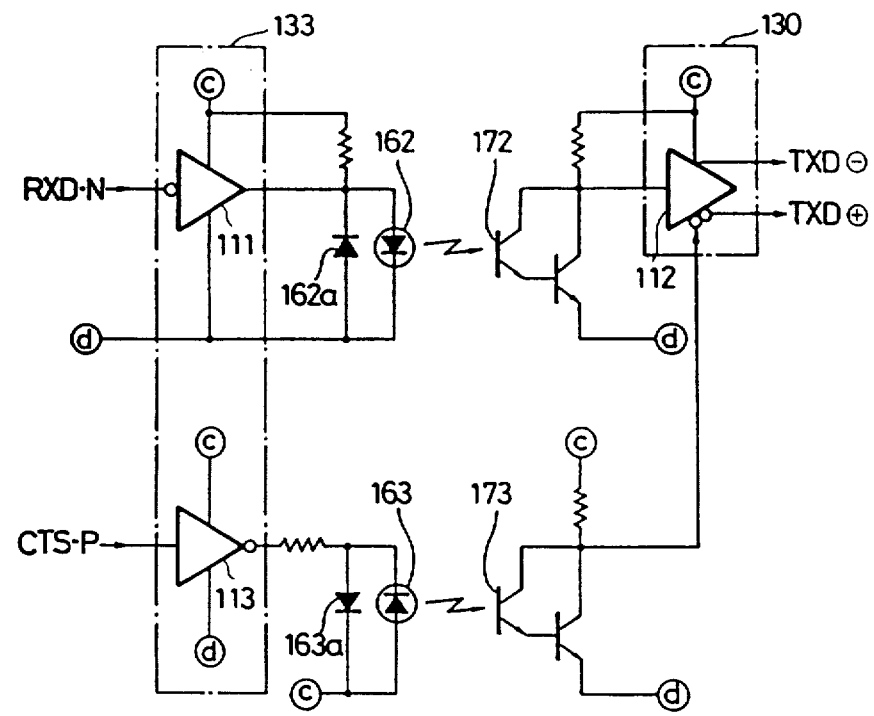
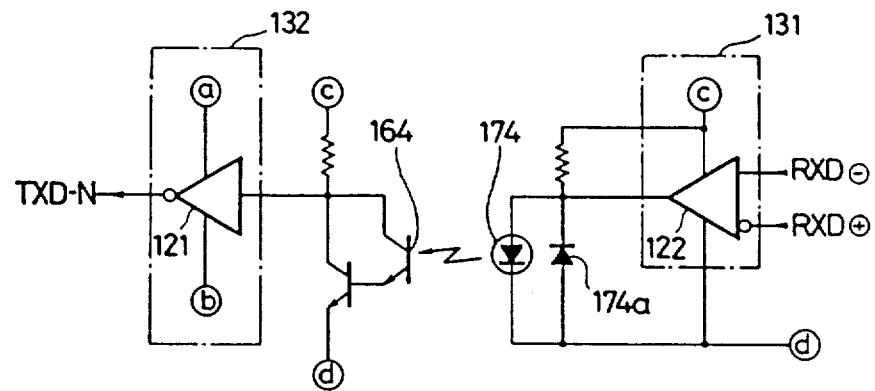
F I G. 13

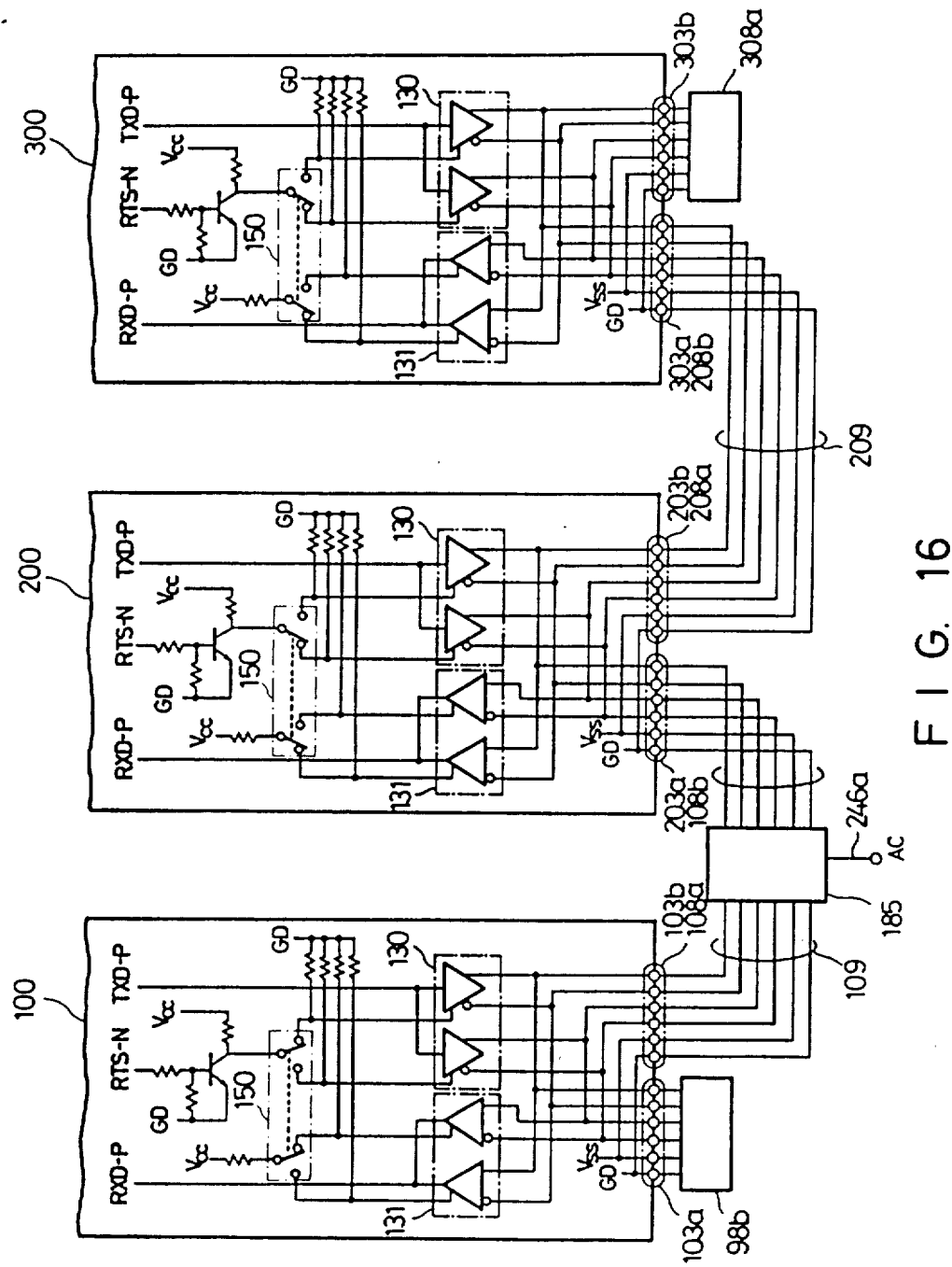
F I G. 16

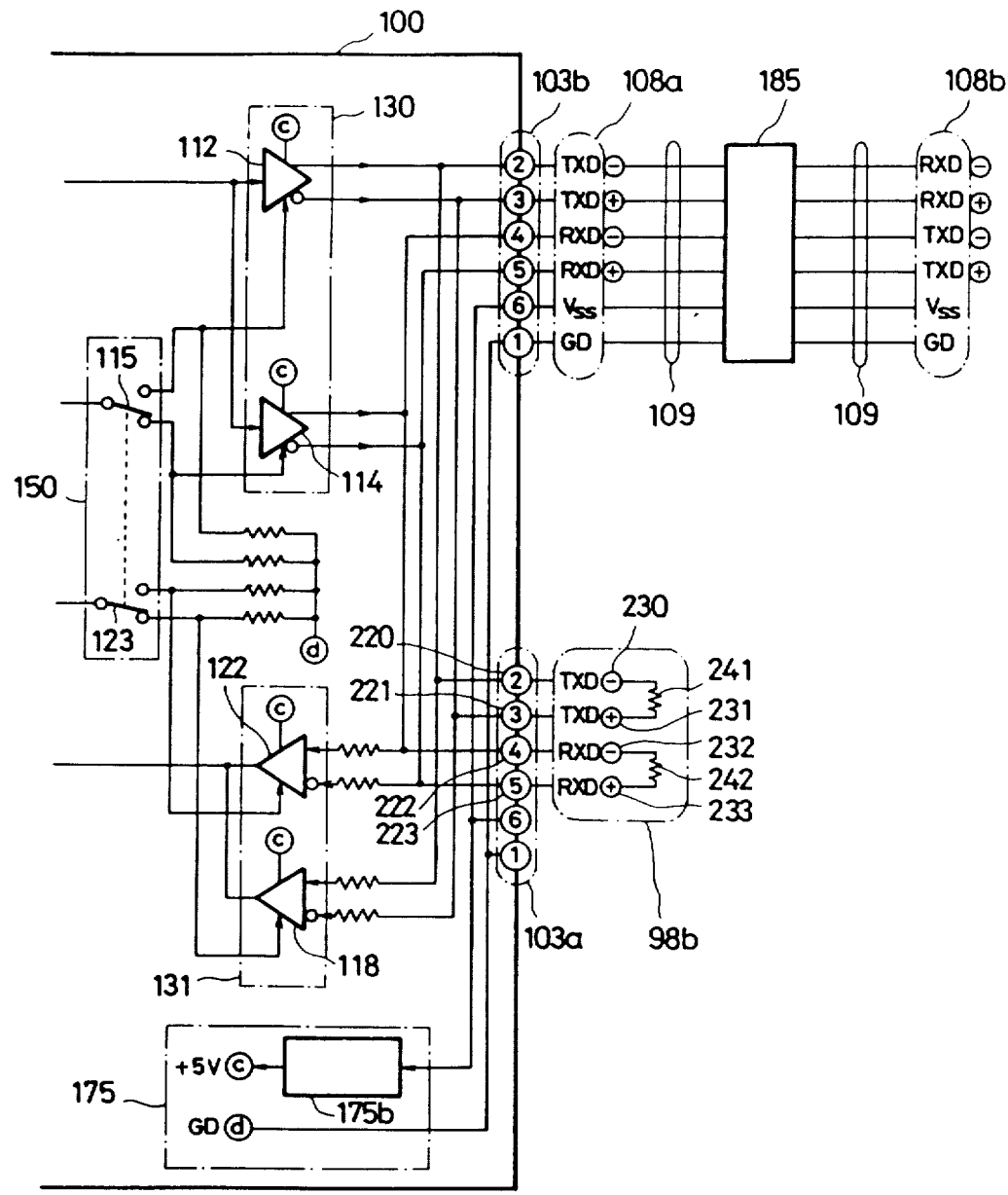
F I G. 17

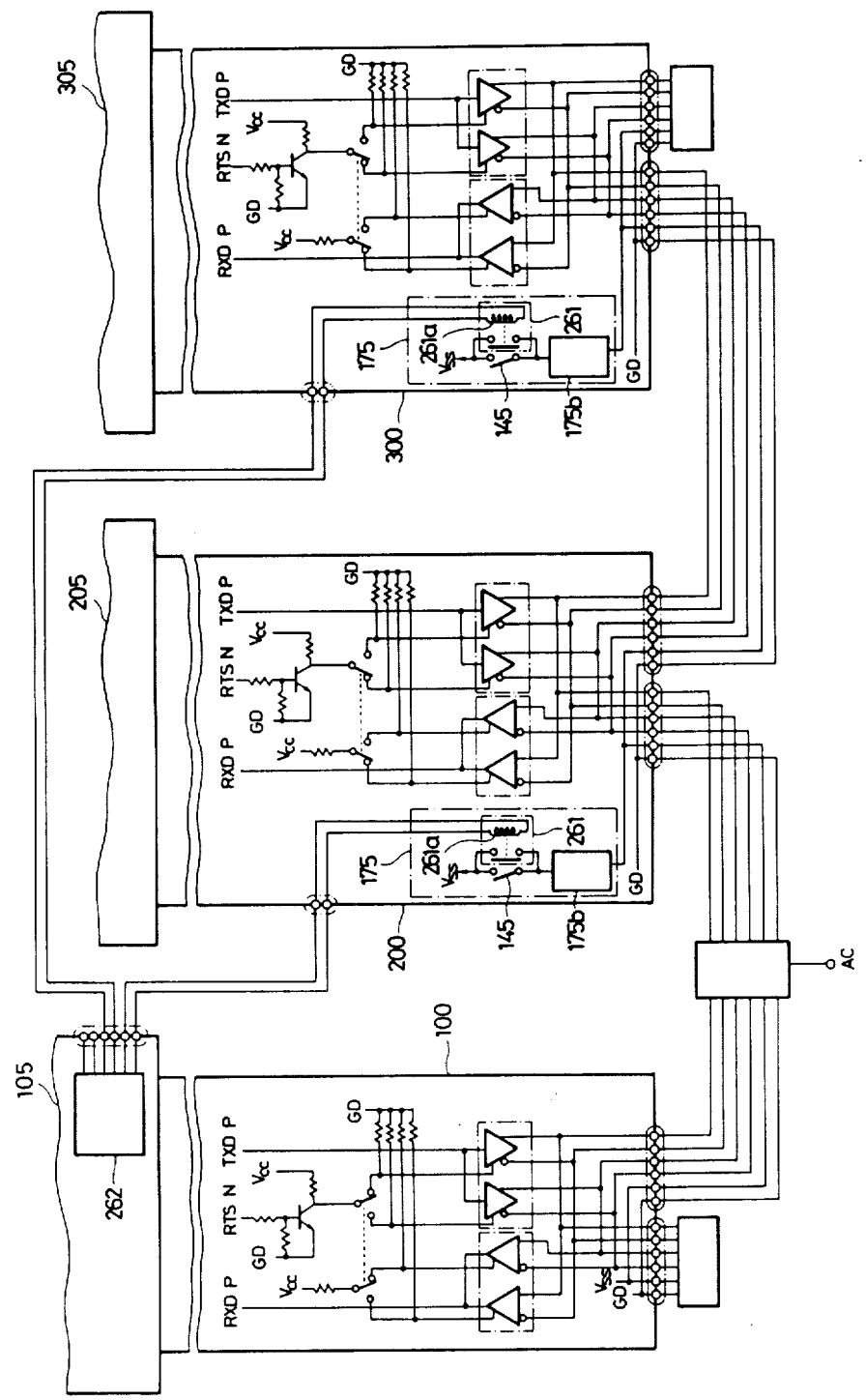
F I G. 22

INTERFACE CONVERTER

BACKGROUND OF THE INVENTION

1. FIELD OF THE INVENTION

This invention relates to an interface converter that converts a first serial interface (hereinafter referred to as "1st I/F") which transfers digital binary serial data, control signals, timing signals, and other data between one electronic device and another electronic device in data transmission, into a second serial interface (hereinafter referred to as "2nd I/F") with specifications different from the 1st I/F. The term "specification" as used herein means electrical, physical, and logical specifications.

2. DESCRIPTION OF RELATED ART

The RS-232-C prescribed by the U.S. EIA, is known widely as a standardized interface. The RS-232-C is suitable for data transfer of a speed in the range of from 0 to 20 kilo-baud and of a distance between two points of less than 15 meters. On the other hand, the RS-422-A, also prescribed by U.S. EIA, is also known as a standardized interface for data communications, able to transmit data at higher speeds and over longer distances as compared with the RS-232-C. Namely the RS-422-A has a data transfer speed of 100 kilo-baud for 1.2 km and enables transfer at even 10 mega-baud over short distances. Therefore in recent years, interface converters which enable electronic devices equipped with an RS-232-C I/F to match the specifications of the RS-422-A have been put on the market.

As shown in FIG. 25, a conventional interface converter 1 has a connector 2 of the RS-232-C I/F on one side and a connector 3 of an RS-422-A I/F on the opposite side. The connector 2 of the converter 1 is connected to a connector 6 of the RS-232-C I/F of an electronic device 5 through a cable 4 of the RS-232-C I/F. The connector 6 is attached to an interface board 7 of the RS-232-C I/F installed in the device 5.

The conventional converter 1 converts therein the RS-232-C I/F into the RS-422-A I/F to which the single connector 3 is connected. When connecting the device 5 to a plurality of other devices 15, 25, ..., the connector 3 is connected to a terminal unit 18 for the next interface converter 11 through a cable 3a, a terminal unit 8, and a cable 9, and then the terminal unit 18 is connected to a connector 13 through a cable 13a. By making the unit 18 a repeater, the unit 18 is connected to a terminal unit 28 for the next interface converter 21 through a cable 19. A repetition of such connection enables connection of a plurality of devices through a plurality of interface converters and to constitute a circuit in a multidrop style.

The above converter 1 (11, 21, ... also same) is constructed using the cable 4 of the RS-232-C I/F and the cable 3a of the RS-422-A I/F. Therefore there are problems that the connection between the converter 1 and the device 5 becomes large-scale and requires practically a very big space.

The conventional multidrop style circuit connection of the RS-422-A I/F could only use repeaters, such as terminal units 8, 18, 28, ... as mentioned above, once in order to avoid using a T-branched cable, which limits the number of devices connected. Circuit connection with these units 8, 18, 28, ... is, however, complicated. Consequently, there is another problem that it is not easy to construct the circuits of the RS-422-A I/F.

SUMMARY OF THE INVENTION:

This invention solves the above problems. It is an object of this invention to provide an interface converter which converts the 1st I/F, such as the RS-232-C, into the 2nd I/F, such as the RS-422-A, with specifications different from the 1st I/F in a small packing space, and which simply constructs circuits of the RS-422-A I/F for a plurality of electronic devices.

A further object of this invention is to provide an interface converter which separates signal ground lines between the devices and which eliminates fears of malfunctions and damage of parts in the devices, even if the power of the devices connected in a multidrop style is supplied from several kinds of power lines.

A further object of this invention is to provide an interface converter which eliminates unstables actions by connecting simply one or two terminal resistors to an opened circuit of the interface converter which is attached to a terminal device among the plurality of devices connected in a multidrop style.

A further object of this invention is to provide an interface converter whose power supply is easy and which simplifies wiring to the plurality of devices in the case where each of the devices connected in a multidrop style has an interface converter.

A further object of this invention is to provide an interface converter on which a parent electronic device can select a desired child electronic device through the parent and a plurality of child interface converters in the case where each of the parent and child devices connected in a multidrop style has an interface converter.

To achieve the above objects, when a first connector is attached to an interface board of the 1st I/F of an electronic device, a second connector and a plurality of third connectors are attached in a body to an interface converter of this invention. The second connector, having the same terminal arrangement as the first connector, is connectable directly to the first connector. Each of the third connectors has a terminal arrangement matched to the 2nd I/F. The data transmission from the 1st I/F to the 2nd I/F is controlled by means of a control line for data transmission of the first connector. Because the second connector is connectable directly to the first connector of the interface board of the 1st I/F, the packing space of this interface converter can be miniaturized. Further, because the plurality of third connectors are attached in a body to the second connector, a cable provided at each end with two connectors matching the third connector enables connector-to-connector connection for the plurality of other electronic devices of the same kind. Thus, the circuits of the 2nd I/F can be easily constructed with high reliability.

In addition to the above constitution, this invention is composed so that the interface converter can be divided into an upper case and a lower case. A first board, on which a transmitting circuit, a receiving circuit, and the power circuit of the 1st I/F are mounted, is attached to the upper case. A second board, on which a transmitting circuit, a receiving circuit, and the power circuit of the 2nd I/F are mounted, is attached to the lower case. Electro-optical elements and opto-electric elements, which optically couple the transmitting circuit of the 1st and 2nd I/F's to the receiving circuit of the 1st and 2nd I/F's, are mounted on the first and second boards, respectively, so that the two electro-optical and opto-electric elements confront each other in the combined condition of the upper and lower case. Thus, a signal ground terminal provided on the first board of the upper case and a signal ground terminal on the second board of the lower case are completely isolated and only the electro-optical elements and the opto-electric elements are coupled optically in this interface converter. Consequently, malfunctions and damage of parts in the devices never occur, even if the power of the devices is supplied from varied power lines and even if a potential difference appears between the signal ground lines of the devices and those of the interface converter.

Also, in this invention, when the third connector has differential type transmitter outputs and differential type receiver inputs, a terminal connector connects detachably to the idle third connector of the interface converter, which is connected to a terminal electronic device among the plurality of electronic devices connected in a multidrop style. This terminal connector has one or two terminal resistors. The terminal resistors interconnect, respectively, two lines corresponding to the differential type transmitter outputs and two lines corresponding to the differential type receiver inputs in the idle third connector so as to complete a closed circuit. Thus, the terminal resistors can be simply attached or detached from this interface converter connected to the terminal electronic device without opening the outer case thereof. As a result, this interface converter realizes a circuit with stable load.

Further, in this invention, the power of the transmitting and receiving circuit of either one or both of the 1st and 2nd I/F is supplied from one or more power supply units provided midway in lines between the plurality of electronic devices. The power supply units are fewer than the interface converters. Consequently, power can be supplied in common to each power circuit of the plurality of interface converters by means of a single power supply unit and it is unnecessary to lead power lines into every interface converter.

Furthermore, in this invention, in the case that the plurality of child electronic devices are connected from a parent electronic device in a multidrop style and each have an interface converter, the power circuit of the interface converter of the 1st or 2nd I/F is provided with a power switch. A remote switch is connected in parallel to each power switch. The remote switch can be opened and closed by remote control from the parent electronic device. A desired child electronic device can be selected without going to the power switch.

BRIEF DESCRIPTION OF DRAWINGS

With the above and additional objects and advantages in mind, as will hereinafter appear, the subject invention will be described with reference to the accompanying drawings, in which:

FIG. 1 is a summary view of a plurality of electronic devices including the interface converter of a first embodiment of this invention;

FIG. 7 is a block diagram of a plurality of interface converters connected to a device;

FIG. 11 is an exploded view of the interface converter of a fifth embodiment of this invention;

FIG. 13 is a detailed block diagram of the electro-optical elements and the opto-electric elements;

FIG. 16 is a block diagram of a plurality of interface converters connected to the device of a sixth embodiment of this invention;

FIG. 17 is a block diagram of the terminal interface converter;

FIG. 22 is a partial block diagram of the plurality of interface converters connected to the device of a seventh embodiment of this invention;

FIG. 25 is a summary view of a plurality of electronic devices including an interface converter of the prior art.

DESCRIPTION OF THE PREFERRED EMBODIMENTS

Figure 2:
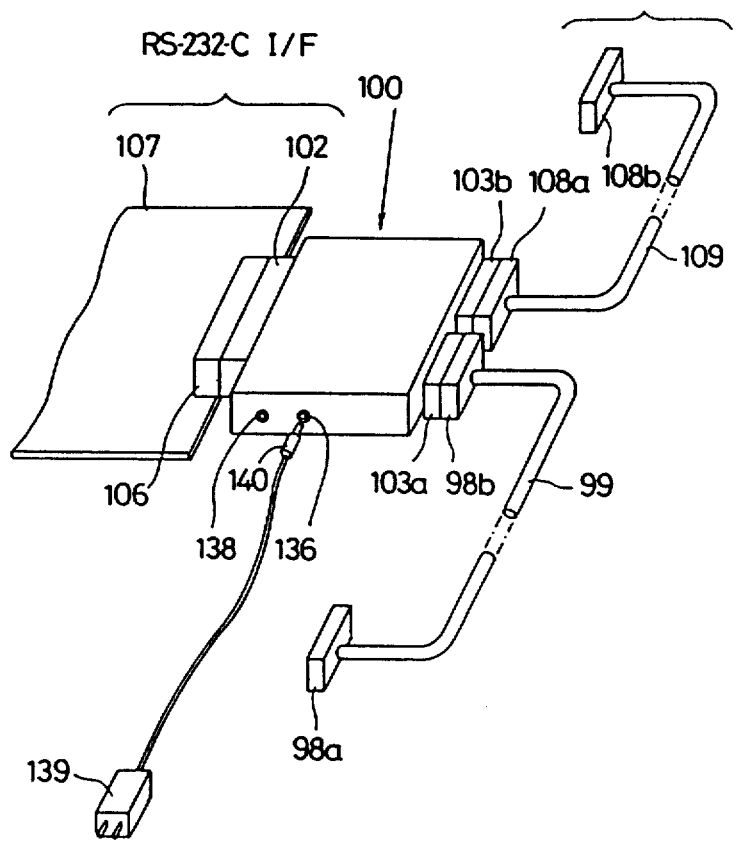
FIG. 2 is a perspective view of the interface converter.

Embodiments of this invention will now be explained in detail on the basis of the drawings. The explanation will be made referring to an interface converter 100 connected to a device 105 in the case where a plurality of devices 205, 305, . . . are connected in a multidrop style from the device 105 shown in FIG. 1. As shown in FIGS. 1 and 2, the converter 100 is provided at one side with a male connector 102 of the RS-232-C I/F and at the opposite side with two female connectors 103a and 103b of the RS-422-A I/F. The connector 102 has the same terminal arrangement as a female connector 106 which is attached to an interface board 107 of the RS-232-C I/F in the device 105. The connector 102 is adapted to be connectable directly to the connector 106. In other words, the connector 102 has input and output terminals arranged to correspond, respectively, to a transmitting terminal and a receiving terminal of the connector 106.

Male connectors 98b and 108a of the RS-422-A I/F are adapted to be connectable to the connectors 103a and 103b, respectively. One end of each of cables 99 and 109 is connected to these connectors 98b and 108a and the other end is connected to male connectors 98a and 108b of the RS-422-A I/F respectively.

When connecting sequentially the devices 205, 305, ... which have, respectively, the interface converters 200, 300, ... equivalent to the converter 100, the connector 108b is connected to a connector 203a, a connector 208a attached to one end of a cable 209 is connected to a connector 203b, and then a connector 208b attached to the other end is connected to a connector 303a of the converter 300. Similar connections are repeated.

Figure 3:
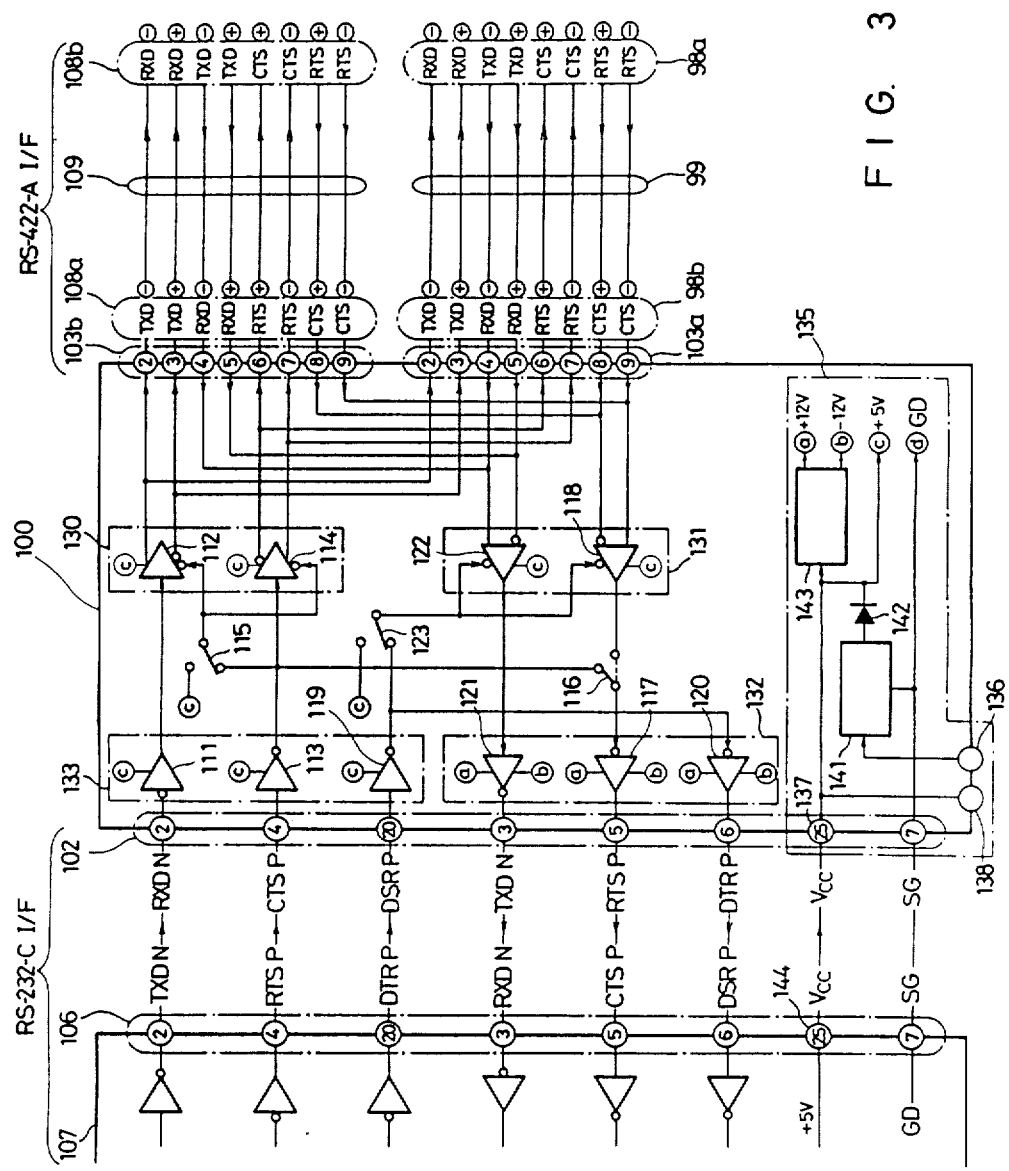
FIG. 3 is a block diagram of the interface converter.

FIG. 3 is a block diagram which shows the above converter 100, the connector 106 which is attached to an interface board 107 of the device 105 connected to the converter 100, the connector 98b of the cable 99, and the connector 108a of the cable 109. In FIG. 3, the encircled numbers illustrate the terminal numbers of the connectors. "TXD" means transmit data, "RXD" means receive data, "RTS" means request-to-send, "CTS" means clear-to-send, "DSR" means data-set-ready, and "DTR" means data-terminal-ready.

The converter 100 has a transmitting circuit 130 and a receiving circuit 131 of the RS-422-A I/F, a transmitting circuit 132 and a receiving circuit 133 of the RS-232-C I/F, and a power circuit 135. A terminal (2) of the connector 102 is connected to terminals (2) and (3) of the connectors 103a and 103b, respectively, through a receiving inverter 111 and a differential type transmitter 112. A terminal (4) of the connector 102 is connected to terminals (6) and (7) of the connectors 103a and 103b, respectively, through a receiving inverter 113 and a differential type transmitter 114. Each of these transmitters 112 and 114 has a tri-state output with high impedance function. The control terminals are connected to the output of the inverter 113 through a switch 115. The switch 115 is adapted to switch the control terminals to a terminal (c) impressed with the source voltage Vcc, from the output of the inverter 113 by manual operation. When transferred to the terminal (c), the switch 115 is adapted to be able to compulsorily change the outputs of the transmitters 112 and 114 to the tri-state.

A branched output of the inverter 113 is connected to a terminal (5) of the connector 102 through a contact of a switch 116 and a transmitting inverter 117. The other contact of the switch 116 is connected to terminals (8) and (9) of the connectors 103a and 103b, respectively, through a differential type receiver 118. A terminal (20) of the connector 102 is connected to a terminal (6) of the connector 102 through a receiving inverter 119 and a transmitting inverter 120. Further, a terminal (3) of the connector 102 is connected to terminals (4) and (5) of the connectors 103a and 103b, respectively, through a transmitting inverter 121 and a differential type receiver 122. Each of these receivers 118 and 122 has a tri-state output, and the control terminals are connected to the output of the above inverter 119 through a switch 123. The switch 123 is adapted to be switchable to the terminal (c), from the output of the inverter 119, by manual operation, like the switch 115. When switched to the terminal (c), the switch 123 can compulsorily change the outputs of the receivers 118 and 122 to the tri-state.

The power circuit 135 of the converter 100 has three power terminals 136, 137, and 138 as shown in FIGS. 2 and 3. The power is adapted to be able to be supplied from any one of these terminals 136–138.

The first power terminal 136 is mounted at the side of the converter 100 as shown in FIG. 2. To the terminal 136 is connected a terminal 140 of an AC adapter 139 which converts AC 100V into DC +9V, for example. The terminal 136 is connected to an input of a DC-DC converter 141 in the circuit 135. The converter 141 converts the output voltage +9V of the AC adapter 139 into the operating voltage +5V for the RS-422-A I/F, and smoothens fluctuations of the output waveform. The output of the converter 141 is connected to the terminal (c) and to an input of a DC—DC regulator 143 through a check-diode 142. A terminal (d) is a signal ground terminal. The regulator 143 converts the output voltage +5V of the converter 141 into the operating voltage +12V for the RS-232-C I/F. The output of the regulator 143 is connected to terminals (a) and (b). The terminals (c) and (d) are connected to each power terminal of the circuit 133 of the RS-232-C I/F and the circuits 130 and 131 of the RS-422-A I/F. The terminals (a), (b), and (d) are connected to each power terminal of the circuit 132 of the RS-232-C I/F.

The connector 102 is provided with a second power terminal 137. The terminal 137 is connected to a power terminal 144 of the connector 106 of the RS-232-C I/F. The terminal 144 is impressed with the operating voltage +5V of the converter 100 from a power circuit regulated to constant voltage (not shown). To the terminal 137 is connected the above terminal (c) and the input of the DC—DC regulator 143.

Further, the third power terminal 138 is mounted at the side of the converter 100 as shown in FIG. 2. The terminal 138 is connected to the terminal (c) and the input of the DC—DC regulator 143 like the above terminal 137.

The above circuit composition of the interface converter can convert the RS-232-C I/F into the RS-422-A I/F. Particularly, by connecting the terminal (4) of the connector 102 to the terminal (5) through the inverter 113, the switch 116, and the inverter 117 and also by connecting the terminal (20) of the connector 102 to the terminal (6) through the inverters 119 and 120, the control lines out of the RS-232-C I/F are made to return. Seen from the RS-232-C I/F side, it seems as if the device confronting the RS-232-C I/F were always connected thereto. When changing over the switch 115 to the inverter 113 side and when the output signal from the inverter 113 connected to the request-to-send terminal (4) of the connector 106 changes to high level, the outputs of the transmitters 112 and 114 become high impedance. When changed to low level, those outputs behave corresponding to the output signals of the inverters 111 and 113, respectively. Accordingly, when there is no request-to-send from the RS-232-C I/F, in other words, when RTS is non-active, the outputs of the transmitters 112 and 114 are disconnected from the RS-422-A I/F circuit.

When changing over the switch 123 to the inverter 119 side and when the output signal from the inverter 119 connected to the data-terminal-ready terminal (20) of the connector 106 changes to high level, the outputs of the receivers 118 and 122 become high impedance. Accordingly, when there is no permission to receive, input of the transmitting signal from the RS-422-A I/F circuit can be inhibited.

Furthermore, when changing over the switch 115 to the terminal (c) side, the outputs of the transmitters 112 and 114 become always high impedance. Also when changing over the switch 123 to the terminal (c) side, the outputs of the receivers 122 and 118 become always high impedance.

Consequently, in multi-drop style connection, it is easy to connect only the concerned devices without changing the connection of the connector 106 or the connectors 103a and 103b.

By constituting the power circuit 135 as described above, when the operating voltage +5V for the RS-422-A I/F is not impressed on the power terminal 144 or when the connector 106 has no power terminal, power can be supplied through the first power terminal 136 from the outside. Further, when the voltage +5V is impressed on the power circuit 144, power can be supplied without using the AC adapter 139 etc. Furthermore, when the impressed line with the voltage +5V can be drawn from the power circuit of the RS-422-A I/F, power can be supplied by connectings this line terminal to the third power terminal 138. Here, the DC—DC converter 141 is protected by the diode 142, even if power is supplied from either of the power terminals 137 or 138.

Figure 5:
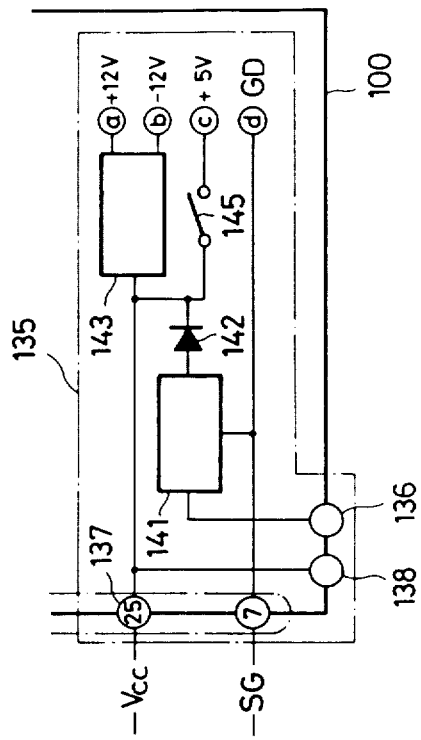
FIG. 5 is a block diagram of the power circuit of the interface converter.
Figure 4:
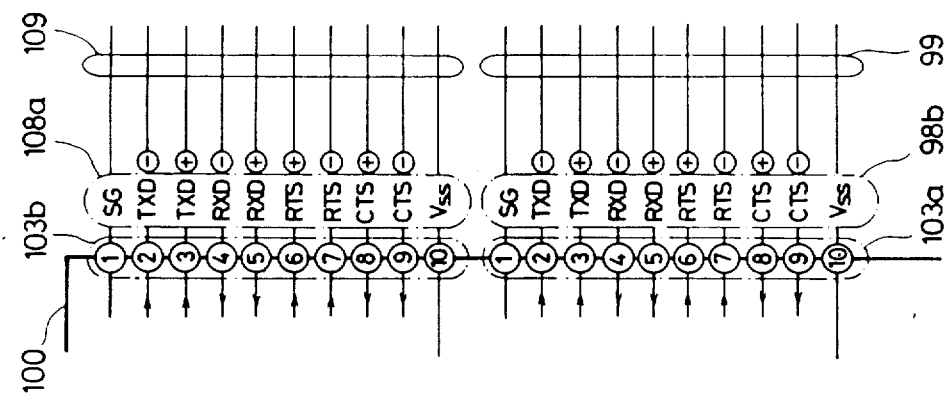
FIG. 4 is a connection diagram of third connectors of the interface converter.

As shown in FIG. 4, the third connectors 103a and 103b of the converter 100 may be provided, respectively, with terminals (10), to which the power terminals 136 or 137 shown in FIG. 3 are connected. Consequently, when the devices 105, 205, 305, ... are connected in a multidrop style as shown in FIG. 1, power can be supplied from the converter 100 through the cables 109, 209, ... to these devices 205, 305, ..., even if the converters 200, 300, ... have no power source. As shown in FIG. 5, when the power circuit 135 is provided between the diode 142 and the terminal (c) with a power switch 145 which is operable from the outside of the converter 100, the device 105 can be connected or disconnected from the other devices 205, 305, ... by operating the switch 145.

Figure 6:
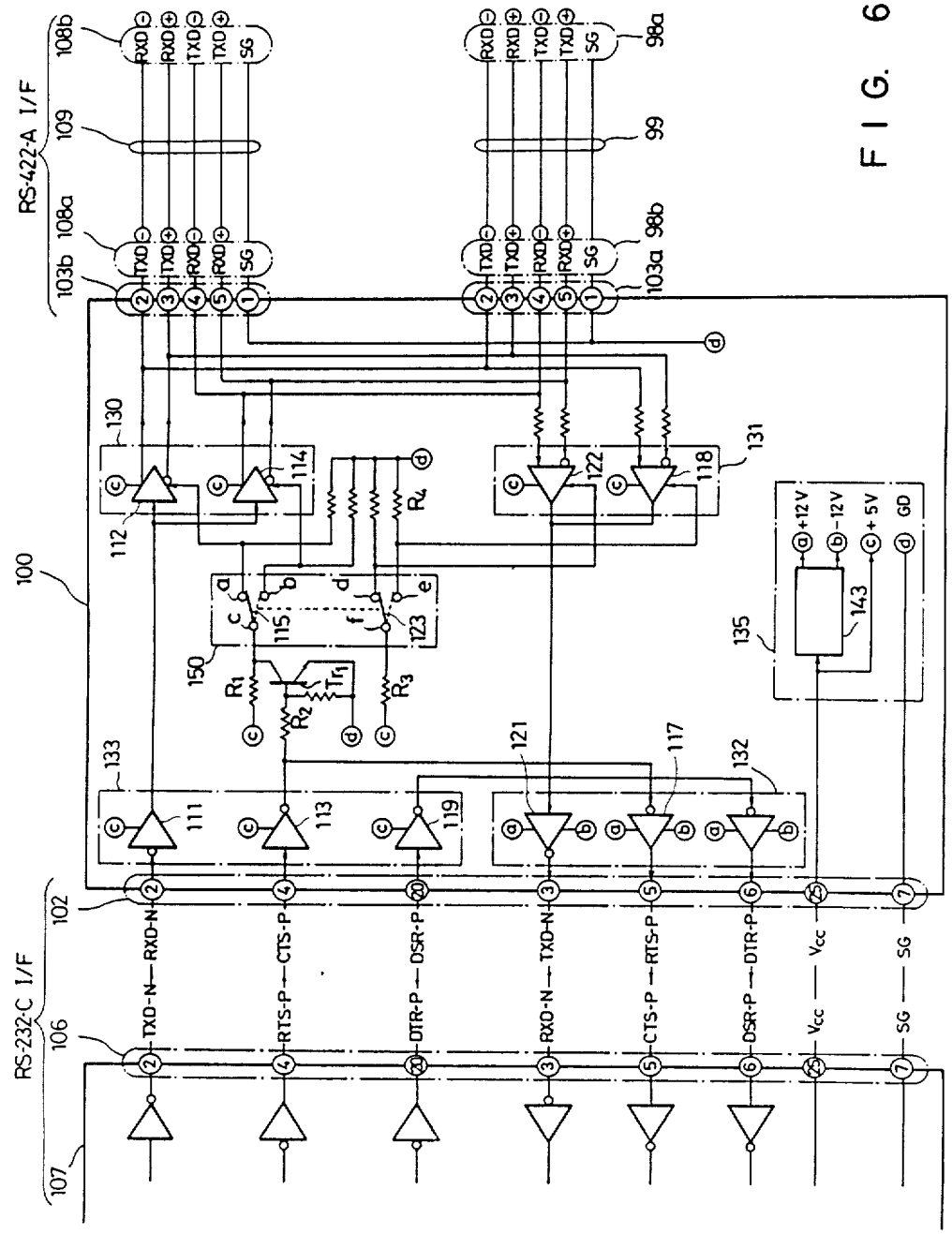
FIG. 6 is a block diagram of the interface converter of a second embodiment of this invention.

Next, a second embodiment of this invention is explained precisely on the basis of FIG. 6. The characteristic point of this embodiment is to make the switches 115 and 123 shown in FIG. 3 a single interlocking switch 150. In addition, the output of the differential type transmitter 112 and the input of the differential type receiver 118 are connected, respectively, to the terminals (2) and (3) of the connectors 103a and 103b. The output of the differential type transmitter 114 and the input of the differential type receiver 122 are also connected, respectively, to the terminals (4) and (5) thereof. The tri-state control input of the transmitter 112 is connected to a contact (a) of the switch 115, and the tri-state control input of the transmitter 114 is connected to the other contact (b) thereof. Then, the terminal (c) with the source voltage Vcc is connected to a common contact (c) thereof through a resistor $R_1$. Further, the tri-state control input of the receiver 122 is connected to a contact (d) of the switch 123, which corresponds to the contact (a) of the switch 115, and the tri-state control input of the receiver 118 is connected to a contact (e) of the switch 123, which corresponds to the contact (b) thereof. Then, the terminal (c) with the source voltage Vcc is connected to a common contact (f) thereof through a resistor $R_3$. The contacts (a), (b), (c), and (d) are grounded through resistors $R_4$, respectively.

Also in this embodiment, the terminal (4) of the connector 106 is connected to the common contact (c) of the switch 115 through the terminal (4) of the connector 102, the inverter 113, and a switching element $Tr_1$. Namely, the output of the inverter 113 is connected to the base of the transistor $Tr_1$ through a resistor $R_2$ and the collector is connected to the contact (c). The numeral 143 is the DC—DC converter of the power circuit 135.

In the composition above described, when transferring the common contacts (c) and (f) of the switch 150 to the contacts (a) and (d) as shown in solid lines of FIG. 6, the converter 100 is set for a parent electronic device, for example, and changes a waiting condition for the request-to-send signal from the terminal (4) of the connector 106. In addition, independently of the presence of the request-to-send signal, the tri-state control input of the receiver 122 becomes high level and active, while that of the receiver 118 becomes low level and non-active. Consequently, the terminals (4) and (5) of the connectors 103a and 103b are connected to the terminal (3) of the connector 106 to thereby become able to receive data from the child electronic devices 205, 305, .... Then, if the request-to-send signal appears from the terminal (4) of the connector 106, the transistor $Tr_1$ turns off and the tri-state control input of the transmitter 112 becomes high level and active, while that of the transmitter 114 becomes low level and non-active. Consequently, the terminal (2) of the connector 106 is connected to the terminal (2) and (3) of the connectors 103a and 103b to thereby become able to transmit data to the child electronic devices 205, 305, ....

Next, when transferring the common contacts (c) and (f) to the contacts (b) and (e) as shown in dashed lines of FIG. 6, the converter 100 is set for a child electronic device, for example. Namely, the tri-state control input of the receiver 118 becomes high level and active, while that of the receiver 122 becomes low level and non-active. Consequently, the terminals (2) and (3) of the connectors 103a and 103b are connected to the terminal (3) of the connector 106 to thereby become able to receive data from a parent electronic device among the devices 205, 305, .... Then, if the request-to-send signal appears from the terminal (4) of the connector 106, the transistor $Tr_1$ turns off and tri-state control input of the transmitter 114 becomes high level and active, while that of the transmitter 112 becomes low level and non-active. Consequently, the terminal (2) of the connectors 106 is connected to the terminal (4) and (5) of the connectors 103a and 103b to thereby become able to transmit data to the parent electronic device among the devices 205, 305, .... Further, if no request-to-send signal appears from the terminal (4), the tri-state control inputs of the transmitters 112 and 114 become all low level, and the outputs of the transmitters 112 and 114 become high impedance. Then, the transmitting circuit 130 becomes disconnected from the RS-422-A I/F circuit, even if the common contact (c) is transferred to either of the contact (a) or (b). FIG. 7 is a partial block diagram in the case that the converter 100 is set for a parent device, and the converters 200, 300, ... are set for child devices by the switch 150, respectively. The interface converter of this embodiment enables switching of the transmitting line and the receiving line just by operating the single switch 150 and has no need for a plurality of cables. Also in this embodiment, connection error of the cables rarely occurs, the connection can be formed compactly, and further each of the connected devices can easily be set for a parent device or child one.

In the above embodiment, although it is shown that a terminal (c) with a source voltage Vcc is connected to the common contact (f) of the switch 123 through the resistor $R_3$, the output of the inverter 119 may be connected to the contact (f) in the same manner as the first embodiment.

Figure 8:
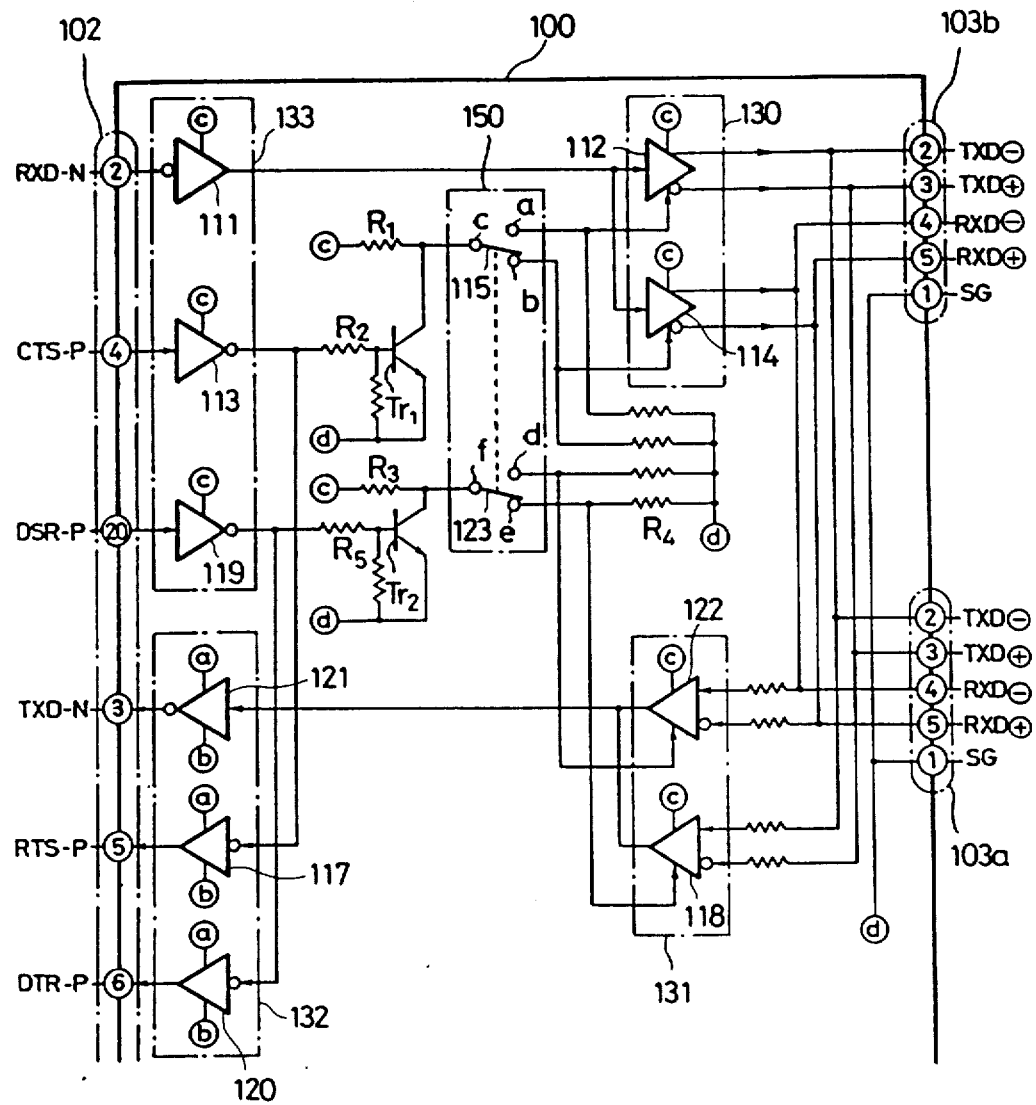
FIG. 8 is a partial block diagram of the interface converter of a third embodiment of this invention.

FIG. 8 shows a third embodiment of this invention. The same reference characters as shown in FIG. 6 designate the same components, respectively. The characteristic point of this embodiment is to connect the terminal (20) of the connector 106 to the common contact (f) of the switch 150 described in the above embodiment through the terminal (20) of the connector 102, the inverter 119, and a switching element Tr$_2$. Namely, the output of the inverter 119 is connected to the base of the transistor Tr$_2$ through a resistor R$_5$, whose collector is connected to the contact (f).

Consequently, only when the data-terminal-ready signal appears from the terminal (20) of the connector 106, does the transistor Tr$_2$ turn off and the tri-state control input of the transmitter 122 or 118 become high level and active according to the switch 150 to thereby become able to receive data from the plurality of other devices 205, 305, . . . .

Figure 9:
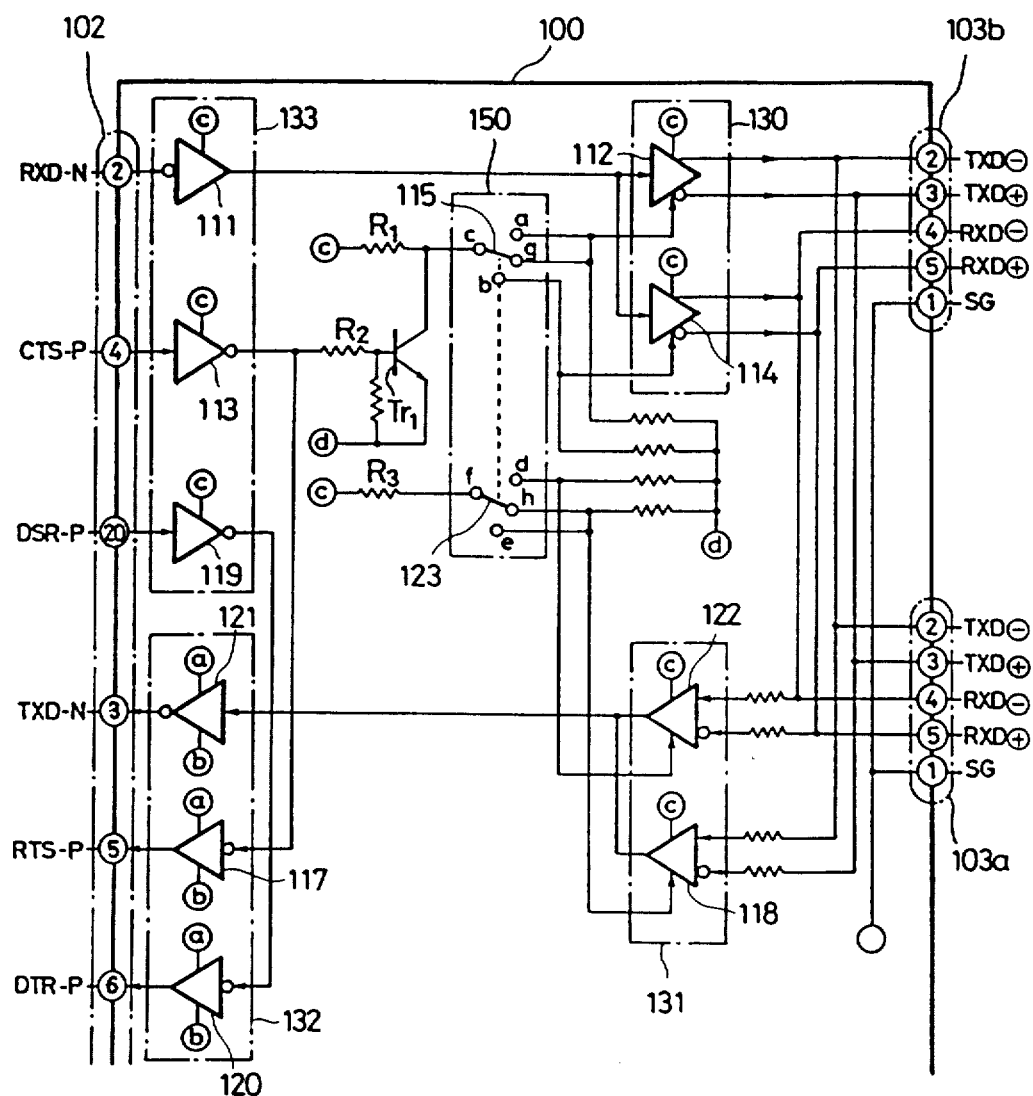
FIG. 9 is a partial block diagram of the interface converter of a fourth embodiment of this invention.

FIG. 9 shows a fourth embodiment of this invention. The same reference characters as shown in FIG. 6 designate the same components, respectively. In FIG. 9, the switches 115 and 123 are provided with third contacts (g) and (h). The contact (g) is connected to the contact (a) (or (b)) and the contact (h) is connected to the contact (e) (or (d)). In the composition described above, when transferring the common contacts (c) and (f) of the switch 150 to the contacts (g) and (h), the tri-state control input of the receiver 118 (or 122) always become high level and active. When requested to send data from the RS-232-C I/F circuit, or when the transistor Tr$_1$ turns off so that the tri-state control input of the transmitter 112 (or 114) becomes high level and active, the output of the transmitter 112 (or 114) of the transmitting circuit 130 returns to the input of the receiver 118 (or 122) of the receiving circuit 131. Consequently, when a transmitting signal of the device 105 is inputted therein as its receiving signal, this is the case where no transmitting signal is sent to the line from the other devices 205, 305. Thus, the interface converter of this embodiment can be given an additional contention system, by which it can promptly transfer data to other devices 205, 305 while constantly monitoring the transmitting condition by itself without relying on the polling method by call/response described in the above embodiment.

Figure 10:
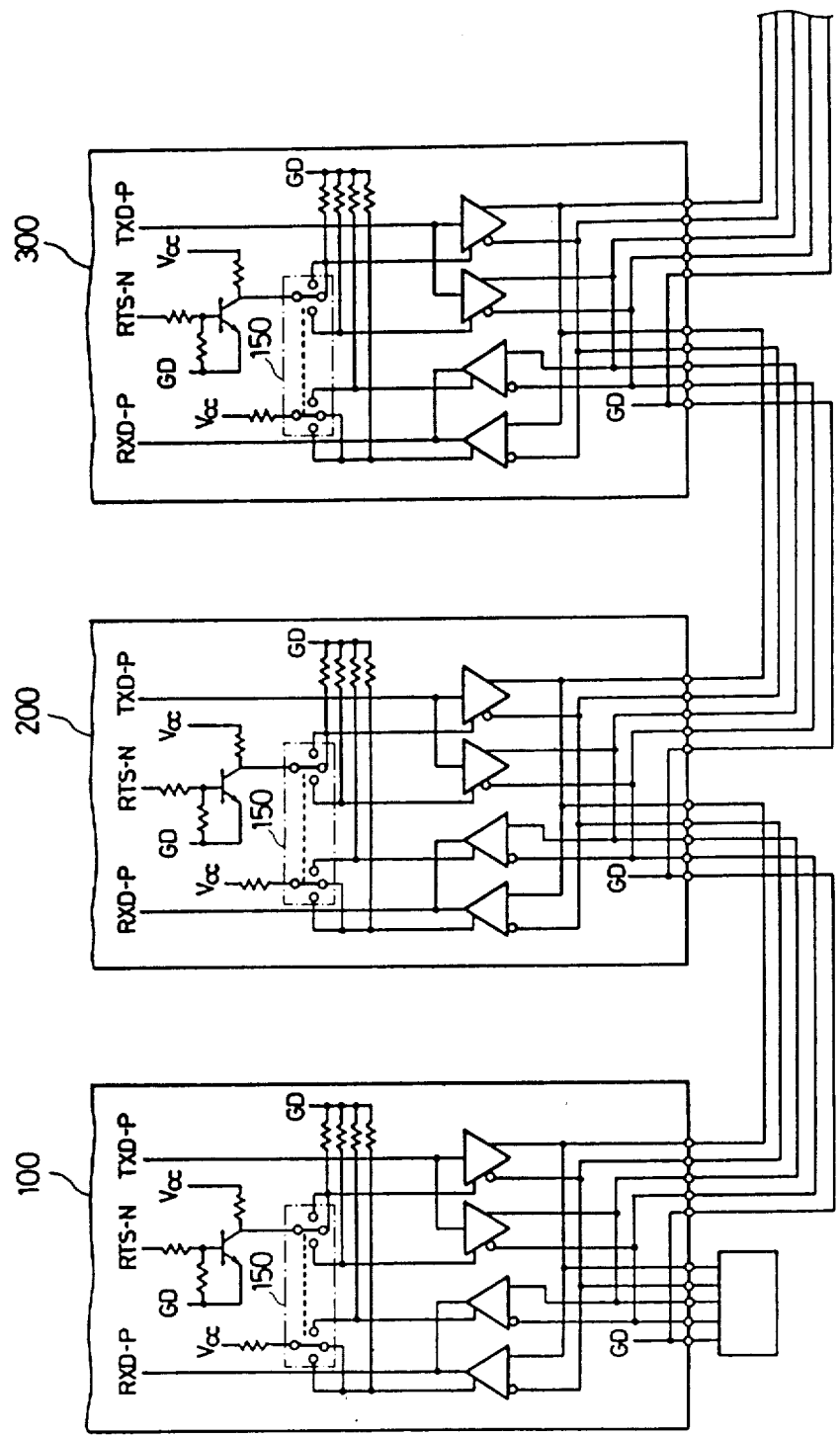
FIG. 10 is a block diagram of a plurality of interface converters connected to a device.

FIG. 10 is a block diagram which shows the condition where the switches 150 of the converter 100, 200, and 300 are switched to the third contacts (g) and (h). When transmitting from the converter 200 and 300 during transmission from the converter 100, transmitting signals other than the self-transmitting signal are inputted in each receiving circuit 131 of the RS-422-A I/F, so that interference occurs and errors arise. At that time, each device stops transmission and restarts transmission on the basis of a predetermined order of precedence predetermined. By switching the common contacts (c) and (f) of the switches 150 to the contacts (a) and (d) (or (b) and (e)), this interface converter can also transmit by means of the polling method.

Figure 12:
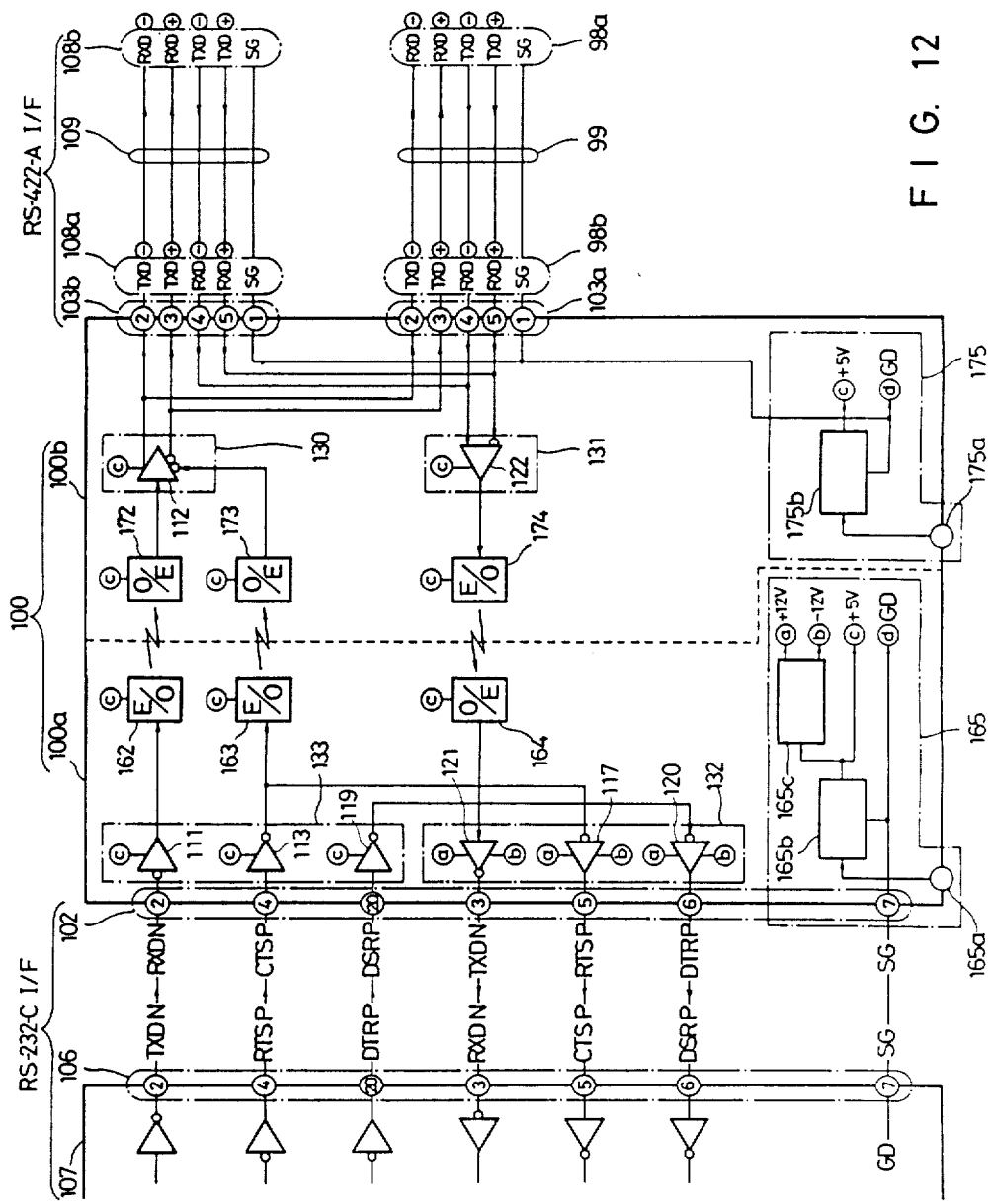
FIG. 12 is a block diagram of the interface converter.

Next, a fifth embodiment of this invention is explained on the basis of FIGS. 11 and 12. The characteristic point is that this converter 100 can be divided into an upper case 100$a$ and a lower case 100$b$ as shown in FIG. 11. A first board 160 is attached to the case 100$a$ by screws 161. On the board 160 are mounted the connector 102 of the RS-232-C I/F, the transmitting circuit 132 for signals, thereto, the receiving circuit 133 for signals therefrom, two light emitting diodes 162 and 163 connected to the circuit 133, a phototransistor 164 connected to the circuit 132, and a power circuit 165 which supplies the power thereto. The power circuit 165 has a power terminal 165$a$, a DC—DC converter 165$b$, and a DC—DC regulator 165$c$. The power terminal 165$a$ is provided through the case 100$a$.

The second board 170 is attached to the case 100$b$ by screws 171. On the board 170 are mounted the two connectors 103$a$ and 103$b$ of the RS-422-A I/F, the transmitting circuit 130 for signals thereto, the receiving circuit 131 for signals therefrom, two phototransistors 172 and 173 connected to the circuit 130, a light emitting diode 174 connected to the circuit 131, and a power circuit 175 which supplies the power thereto. The power circuit 175 has a power terminal 175$a$ and a DC—DC converter 175$b$. The power terminal 175$a$ is provided through the case 100$b$.

A hole 166 is provided in the case 100$a$ and the board 166 and a hole 176 in the case 100$b$ and the board 176. A hollow 167 is provided in the case 100$a$ and a protrusion 177 on the case 100$b$. A bolt 180 is passed through the hole 166 and 176 so as to join the case 100$a$ and 100$b$ by a nut 181. Then, the protrusion 177 inserts into the hollow 167 to prevent the case 100$a$ and 100$b$ from dislocation. Consequently, the above light emitting diodes 162, 163, and 174 and the phototransistors 172, 173, and 164 confront each other to thereby couple optically. At the same time, placing the electronic parts of the RS-232-C I/F over those of the RS-422-I/F enables the converter 100 to be compact.

FIG. 13 is a detailed block diagram including the light emitting diodes 162, 163, and 174, and the phototransistors 172, 173, and 164 confronting these. In this embodiment, diodes (including light emitting diodes) 162$a$, 163$a$, and 174$a$ for protection against impression with reverse bias are connected in parallel to the light emitting diodes 162, 163, and 174, respectively, and the phototransistors 172, 173, and 164 are Darlington connected, respectively.

Figure 14:
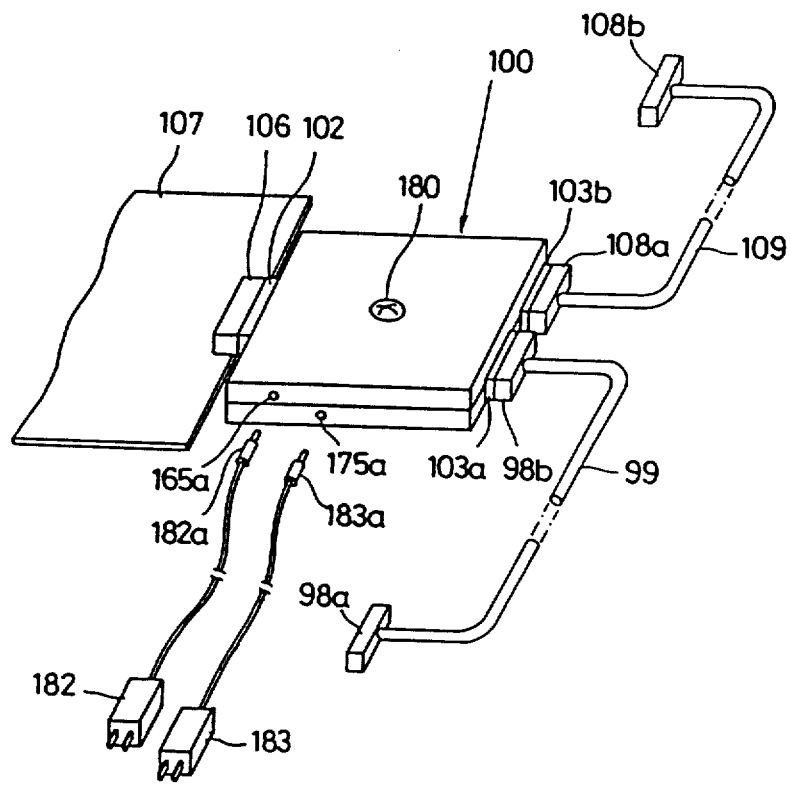
FIG. 14 is a perspective view of the interface converter.

As shown in FIG. 14, when connecting the terminals 182$a$ and 183$a$ of the AC adapters 182 and 183, which convert AC 100V into DC +9V, to the power terminals 165$a$ and 175$a$, respectively, after each connector has been connected to the predetermined connector, the terminal (c) of the power circuit 165 shown in FIG. 12 is impressed with each operating voltage +5V of the receiving circuit 133, the light emitting diodes 162 and 163, and the phototransistor 164 from the DC—DC converter 165$b$. The terminals (a) and (b) thereof are impressed with the operating voltage ±12V of the transmitting circuit 132 from the DC—DC regulator 165$c$. Also, the terminal (c) of the power circuit 175 is impressed with each operating voltage +5V of the transmitting circuit 130, the receiving circuit 131, the light emitting diode 174, and the phototransistors 172 and 173 from the DC—DC converter 175$b$. In this way, the signal ground terminal (d) on the board 160 of the upper case 100$a$ and the signal ground terminal (d) on the board 170 of the lower case 100$b$ are completely isolated and only the light emitting diodes 162, 163, and 174, and the phototransistors 172, 173, and 164 are coupled optically in the converter 100. Consequently, the signal ground lines of the devices connected through the converter 100 are separated therein. Thus, malfunctions and damage of parts in the devices never occur, even if the power of the devices is supplied from varied power lines and a potential difference appears between the signal ground lines of the devices and those of the interface converter.

Although in the above, a light emitting diode is used as the electro-optical element and a phototransistor as the opto-electric element, other elements of the same kind may be used instead. These elements may be provided with a dust-proof cover which is light-transmittable, or coupled by means of optical fibers.

Figure 15:
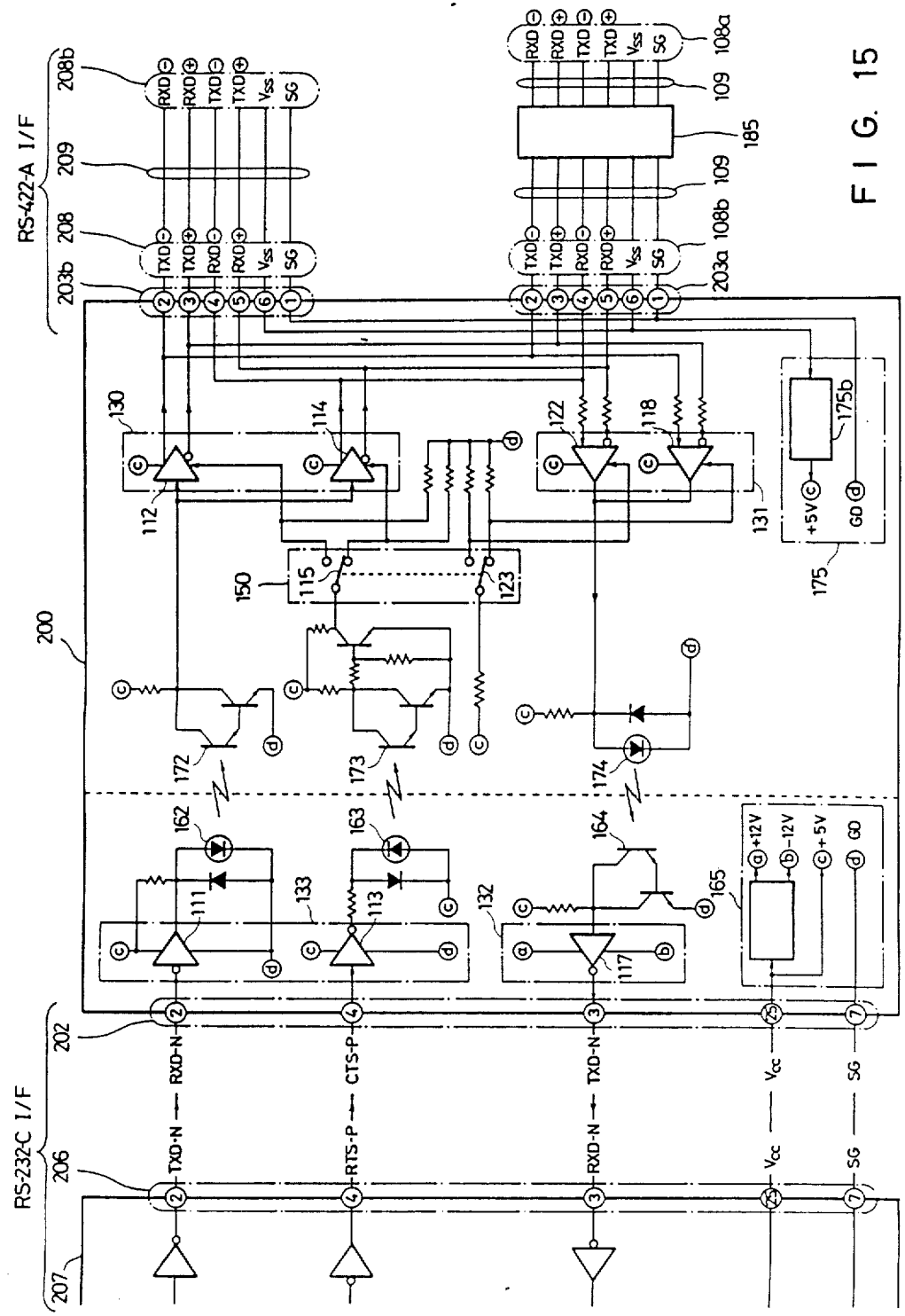
FIG. 15 is a block diagram of an applied embodiment of the interface converter.

FIG. 15 shows an application of the fifth embodiment. This shows the composition of the interface converter 200, whose characteristic points are to have the interlocking switch 150 shown in the second embodiment (FIG. 6) as compared to the fifth embodiment (FIG. 12), to power the circuit 165 from the second connector 202 and to power the circuit 175 from a power supply unit 185 provided across the cable 109. Here, in FIG. 15 the terminals (5), (6), and (20) of the connector 106 and 102 shown in FIG. 12 are omitted.

Next, a sixth embodiment of this invention is explained on the basis of FIG. 16-FIG. 21. The characteristic points of this embodiment are that terminal connectors 98b and 308a are connected detachably to the idle (unused) connectors 103a and 303b of the converter 100 and 300 which are attached to the terminal devices (the devices 105 and 305 in this embodiment) among the plurality of devices 105, 205, and 305 (shown in FIG. 1) connected in a multidrop style and to provide the above power supply unit across the cable 109.

Figure 18:
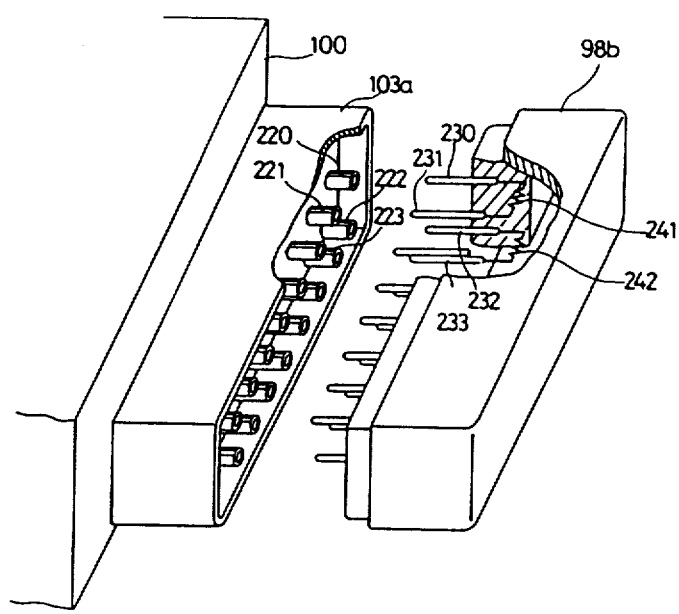
FIG. 18 is a partially cutaway perspective view of the terminal connector including an idle connector.

As shown in FIGS. 17 and 18, to the idle connector 103a of the converter 100 is connected detachably the terminal connector 98b. The idle connector 103a has female pins 220, 221, 222, and 223. The female pins 220 and 221 are connected to the corresponding two lines which join the outputs of the differential type transmitter 112 and the inputs of the differential type receiver 118, while the female pins 222 and 223 are connected to the corresponding two lines which join the outputs of the differential type transmitter 114 and the inputs of the differential type receiver 122. The terminal connector 98b has male pins 230 and 231 inserted to the pins 220 and 221, and male pins 232 and 233 to the pins 222 and 223. Terminal resistors 241 and 242 are connected between these pins 230 and 231, and 232 and 233, respectively. These resistors have a resistance value equal to the sum of the impedances of the circuits, for example, 100Ω. The idle connector 303b of the converter 300 and the terminal connector 308a connected thereto, shown in FIG. 16, are composed in the same manner as the above idle connector 103a and the terminal connector 98b. In the embodiment of FIG. 16, the converter 100 is set for a parent device, and the converters 200 and 300 are set for child devices by the switch 150.

The above terminal connectors 98b and 308a enable connection of the terminal resistors 241 and 242 to the differential type transmitter outputs and the differential type receiver inputs of the idle connectors 103a and 303b by just inserting the pins 230-233 to the pins 220-223 which join the differential type transmitter outputs and the differential type receiver inputs thereof. Thus, the terminal resistors can be simply attached to the converters 100 and 300 without opening the outer case thereof. An RS-422-A circuit with a stable load can be composed by making the input and output of the idle connectors 103a and 303b closed circuits. If nothing is connected to the above input and output, these differential inputs and outputs usually form an opened circuit and thus become unstable.

In the case of adding another device to the terminal device 105 or 305, the terminal connector 98b or 308a is detached from the idle connector 103a or 303b, a predetermined cable is connected to the connector 103a or 303b, and then the terminal connector is connected to an idle connector of the converter attached to the new terminal device. Consequently, the number of devices connected can be easily increased or decreased in one operation by attaching or detaching the terminal connector.

Figure 19:
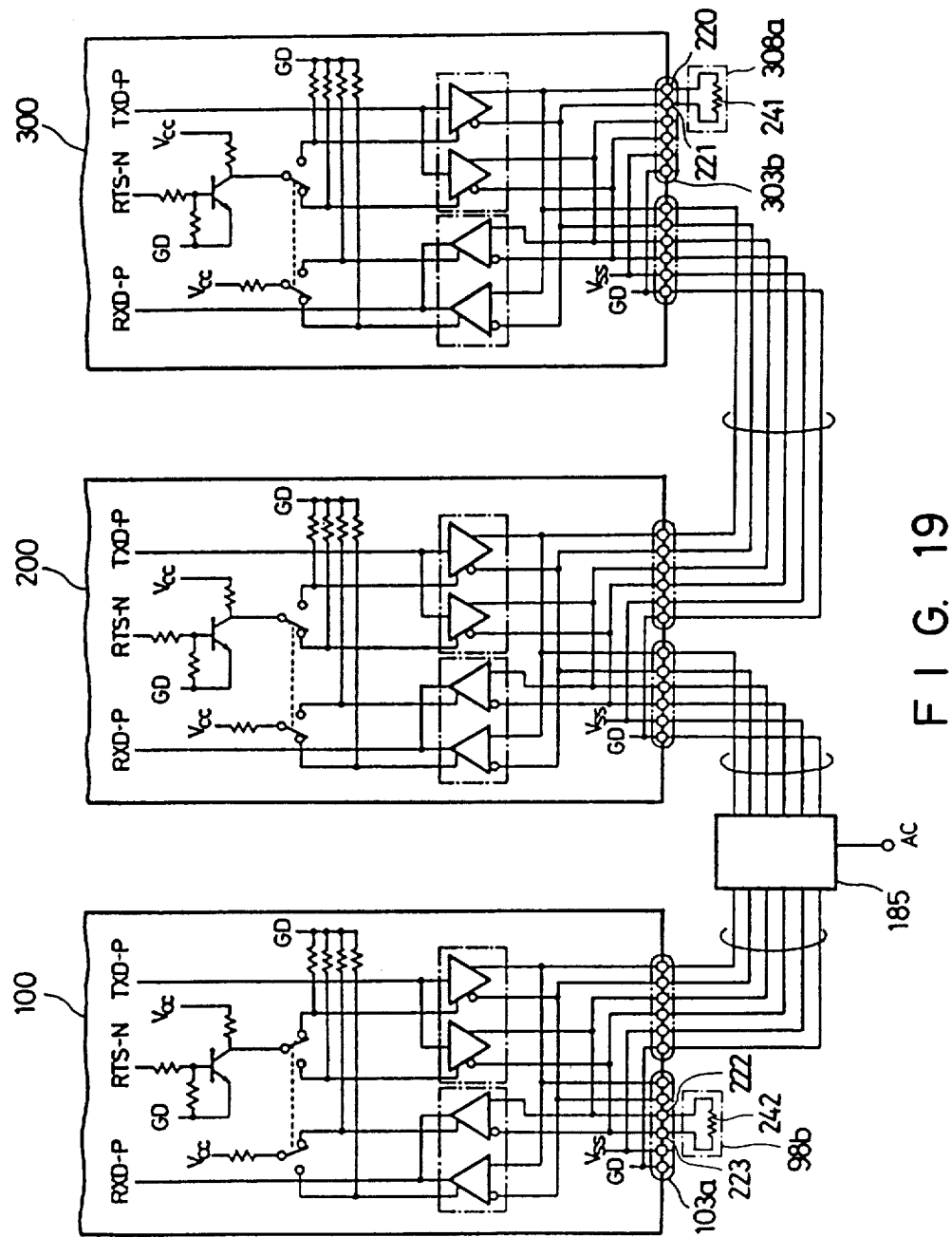
FIG. 19 is a block diagram of the terminal connector in another connection.

Although in the above it is shown that the terminal connectors 98b and 308a are provided with the two terminal resistors 241 and 242, respectively, and are connected to both of the idle connectors 103a and 303b of the converter 100 and 300, the above composed terminal resistor 98b or 308a may be connected to just one of the idle connectors 103a or 303b of the converter 100 and 300 if there are few devices. In the case that the terminal connector is provided with only one of the resistor 241 or 242, the same effects as described above can be obtained by connecting the connector 308a with the resistor 241 to the connector 303b and also the connector 98b with the resistor 242 to the connector 103a as shown in FIG. 19. The terminals of these idle connectors are properly selectable according to a system composition.

Figure 20:
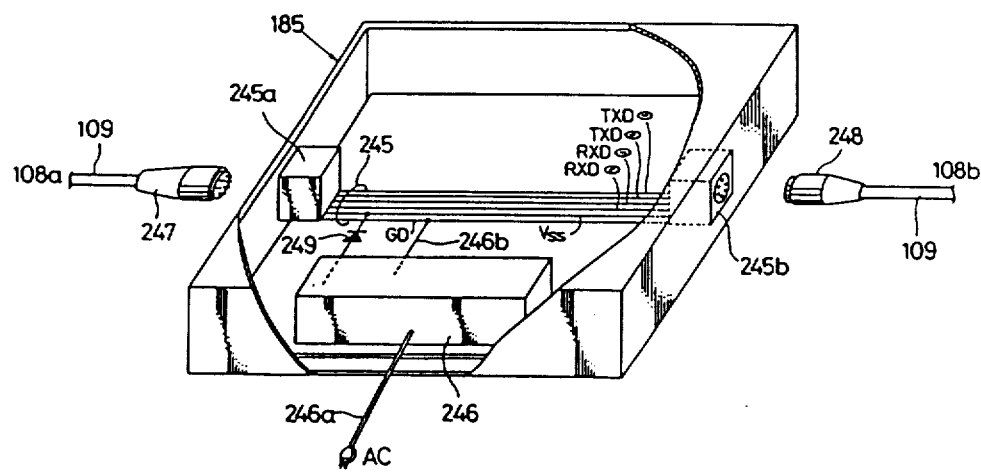
FIG. 20 is a partially cutaway perspective view of the power supply unit of the interface converter.

As shown in FIG. 20, the power supply unit 185 is composed of a cable wiring portion 245 of the cable 109 and an isolated AC adapter 246 converting an AC power source into a DC power source. Receptacles 245a and 245b are mounted at each end of the portion 245. To the receptacle 245a is mounted a connector 247 of the cable 109 for the connector 108a side and to the receptacle 245b is mounted a connector 248 of the cable 109 for connector 108b. An AC power source line 246a is connected to the adapter 246. The DC power source output of the adapter 246 is connected to the common power bus line Vss of the portion 245 through a check-diode 249. A signal ground line 246b of the adapter 246 is connected to the signal ground line GD of the portion 245. Here, the mounting position or number of the receptacle 245a or 245b is not always as the above. For example, one or more receptacles may be mounted at a top or front face of the unit 185.

The above composed power supply system of the converters 100, 200, and 300 shown in FIG. 16 enables the single unit 185 to supply power in common to each power circuit 175 (shown in FIG. 17) of the three converters 100, 200, and 300. As a result, it is unnecessary to lead power lines into each of the converters 100, 200, and 300 also unnecessary to increase the number of wiring from the outside of the devices 105, 205, and 305 thereto.

In the case that the unit 185 is single as described above and different from the case shown in FIG. 21 hereinafter, it may be needless to provide the check-diode 249 of the unit 185. Further, although in the above it is shown that the DC power is supplied to the common power bus line Vss through the check-diode 249, it is not always as the above. The DC power source may be directly connected to the common power bus line Vss without using the check-diode 249 if adapted to supply power only to either the upstream or downstream direction for the arrangement direction of the device 105, 205, 305, . . . .

Although in the above FIG. 15 it is shown that the converter 200 is provided with the power circuit 165 for the RS-232-C and the power circuit 175 for the RS-422-A and power is supplied only to the circuit 175 from the unit 185, power may be supplied only to the circuit 165 or to both of the circuit 165 and 175 from the unit 185.

Figure 21:
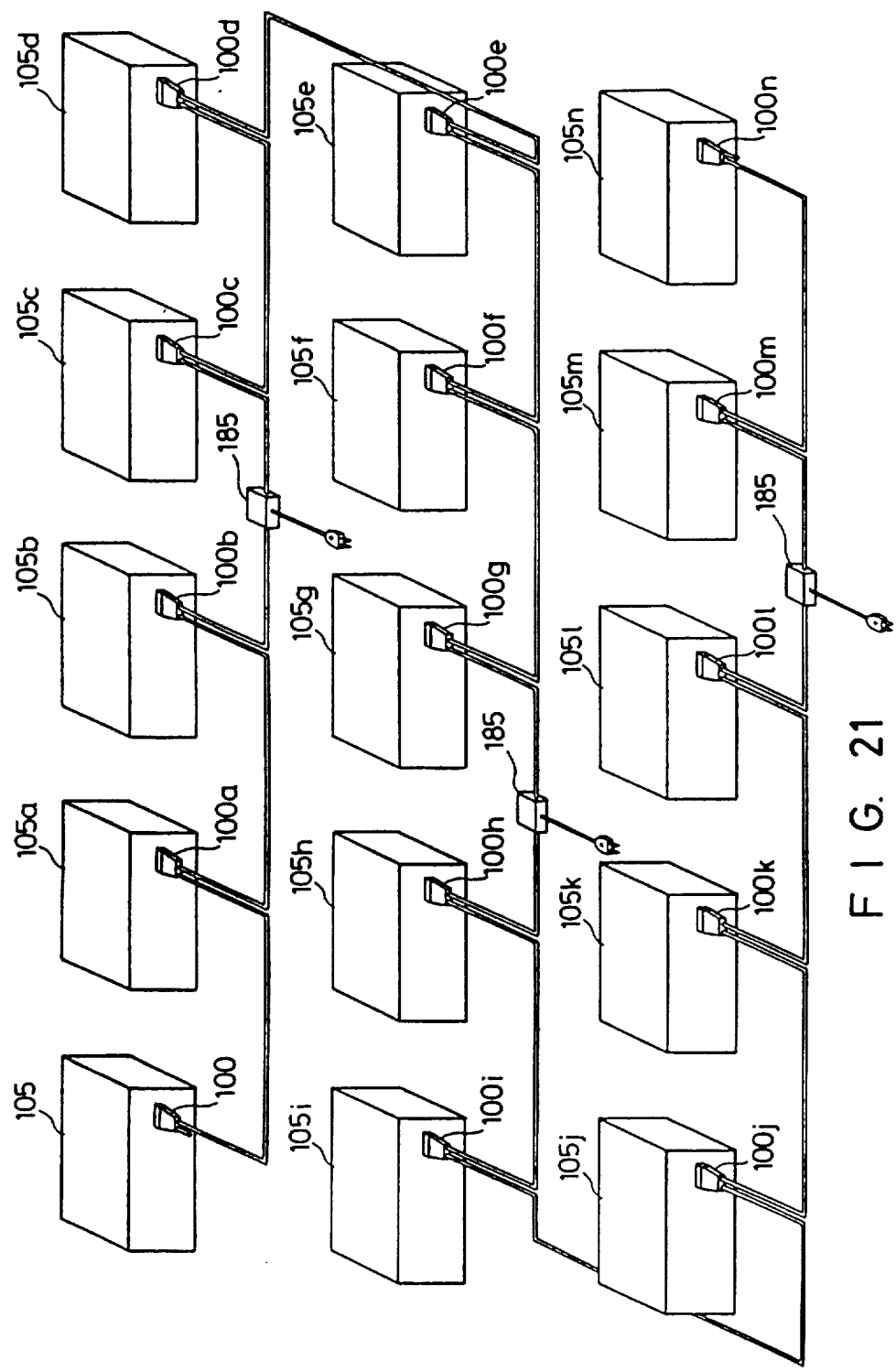
FIG. 21 is a perspective view of the power supply units in another connection.

Further, although in the above, a method of supplying power by means of a single power supply unit for the three interface converters is described, the number of the converters is not always as the above. As shown in FIG. 21, if there are more converters, a large number of converters 100, 100a, 100b, . . . , 100n may be provided with the units 185, 185, . . . which are fewer than the converters. Here, the number of the units 185 is decided depending on the number of the devices 105, 105a, 105b, . . . , 105n, and the length and thickness of the cables to which those are connected and so on. In the above shown in FIG. 21, even if no power is supplied from the specific unit 185, highly reliable supply of power can be obtained because the other units 185 back up it and supply the power.

Next, a seventh embodiment of this invention is explained on the basis of FIG. 22. As shown in FIG. 22, in the case that the parent device 105 and the plurality of child devices 205 and 305 connected therefrom in a multidrop style are provided with the connectors 100, 200, and 300, respectively, each power circuit 175 of the RS-422-A I/F in the converters 200 and 300 attached to the child devices 205 and 305 has a normally-opened power switch 145. An electromagnetic relay 261 of remote switches is connected in parallel to each switch 145. The parent device 105 is provided with a selecting circuit 262 which selects one or both of the child devices 205 and 305. The output of the selecting circuit 262 is connected to a coil 261a of the above relay 261. Thus, energization of the relay 261 from the parent device 105 by remote control enables the relay switch to close, so that a desired child device can be selected without going to the power switch 145. The remote switch may be a photocoupler which consists of an electro-optical element connected to the output of the selecting circuit 262 and an opto-electric element connected in parallel to the power switch 145 instead of the electromagnetic relay.

Figure 23:
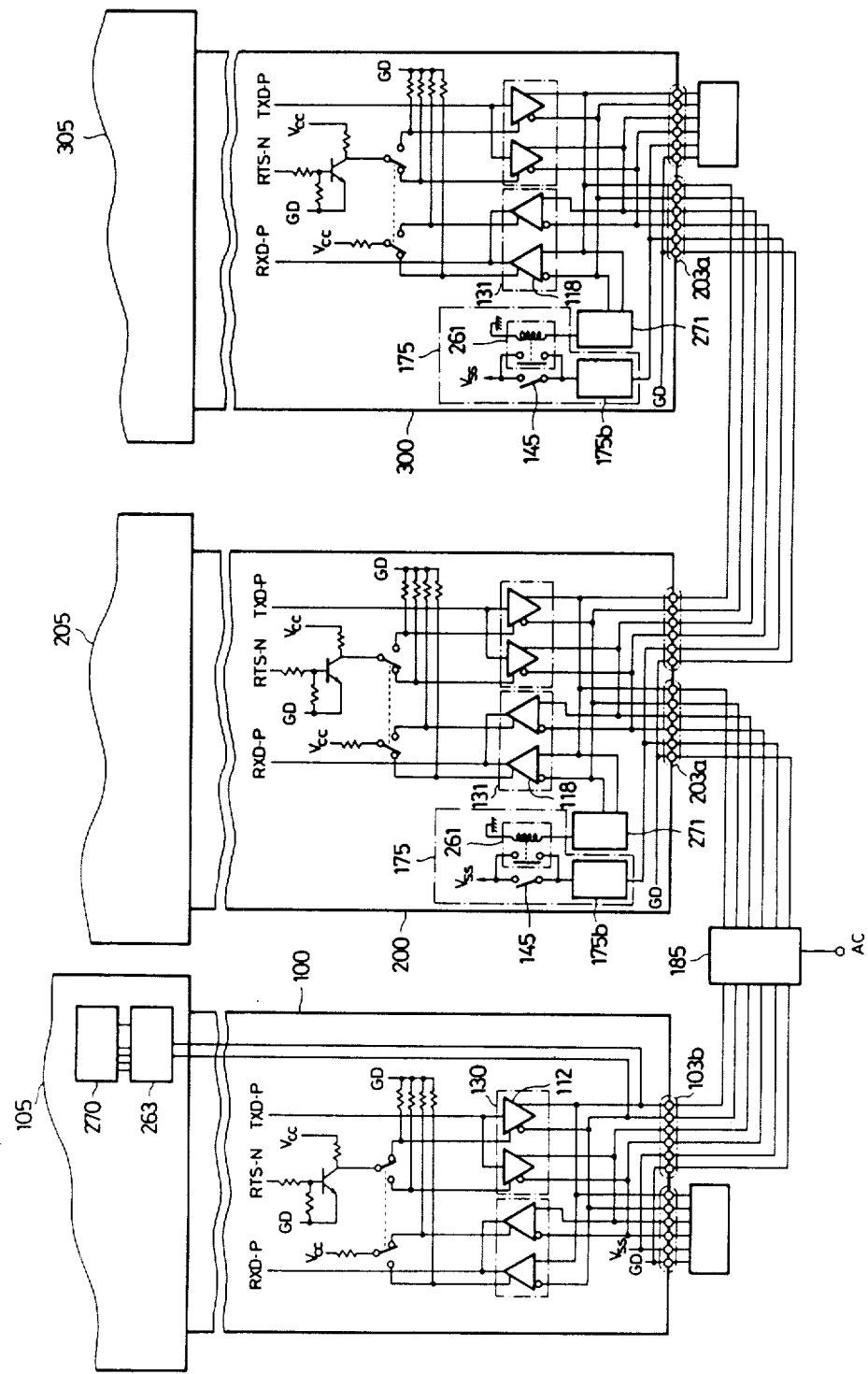
FIG. 23 is a partial block diagram of a plurality of interface converters connected to the device of an eighth embodiment of this invention.
Figure 24:
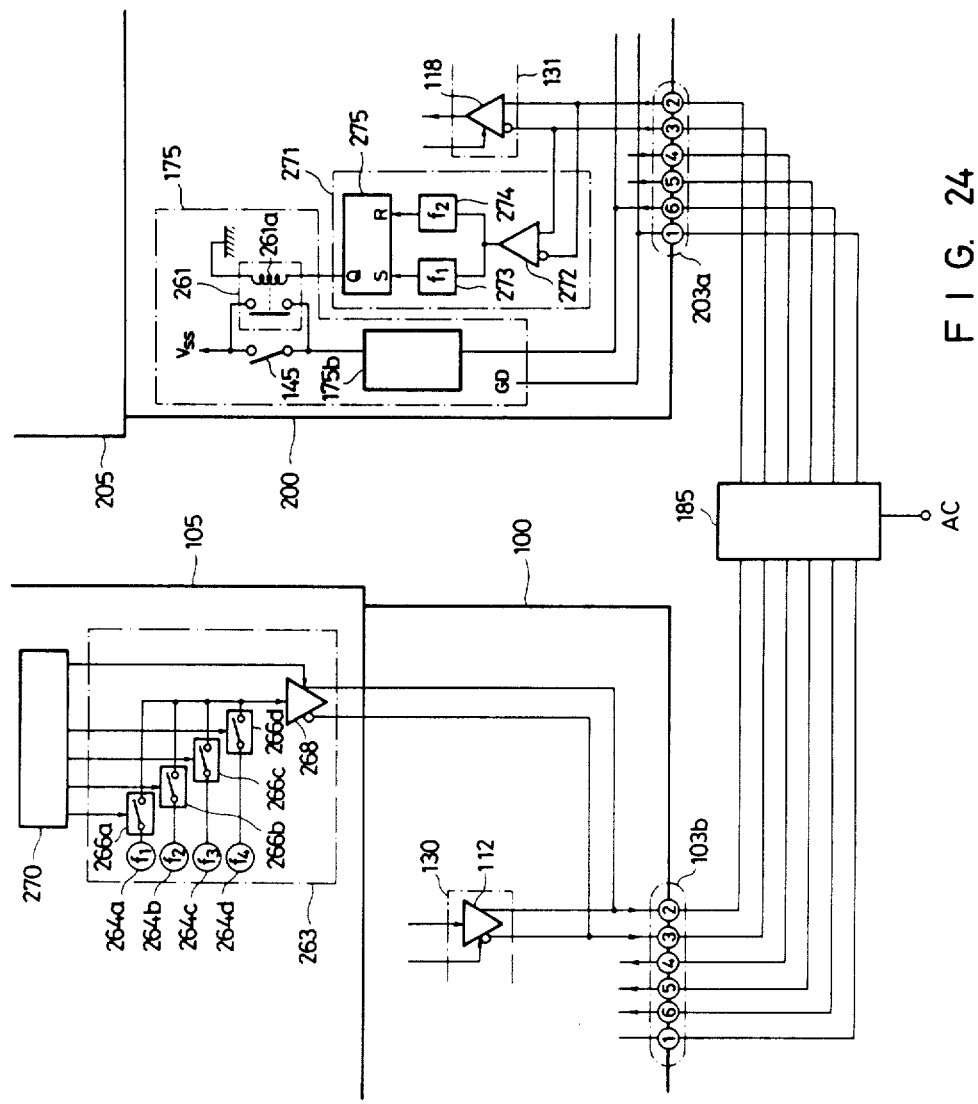
FIG. 24 is a detailed block diagram shown in FIG. 23.

FIGS. 23 and 24 show an eighth embodiment of this invention. The parent device 105 has a selecting circuit 270 and an oscillating circuit 263. The oscillating circuit 263 consists of four oscillators 264a, 264b, 264c, and 264d, switching circuits 266a, 266b, 266c, and 266d connected to each output of those oscillators 264a-264d, respectively, and a differential type transmitter 268. The switching circuits 266a, 266b, 266c, and 266d turn on or off by a selecting signal of the circuit 270. The output of the circuit 270 is connected to a tri-state control input of a transmitter 268, the output of which is connected to the terminals (2) and (3) of the transmitting circuit 130 of the RS-422-A I/F in the converter 100. The four oscillators 264a-264d have oscillating frequencies $f_1-f_4$, respectively, in the range of audio-frequencies. Two kinds of the peculiar frequencies $f_1$, $f_2$ and $f_3$, $f_4$ are assigned to the two child devices 205 and 305 as one set. In this embodiment, the oscillators 264a and 264b are assigned to the child device 205 and the oscillators 264c and 264d are assigned to the child device 305.

Each of the converters 200 and 300 attached to the child devices 205 and 305 has the power switch 145 of the circuit 175 in the same manner as the seventh embodiment. An electromagnetic relay 261 is connected in parallel to each power switch 145. An actuating-relay circuit 271 is provided between the terminals (2) and (3) of the RS-422-A I/F in the converters 200 and 300 and the relay 261. The circuit 271 consists of a differential type receiver 272, tuning circuits 273 and 274, and a flip-flop 275. When the connection frequency signal $f_1$ for the concerned device 205 arrives at the tuning circuit 273 from the oscillator 264a, the output signal of the circuit 273 is led to the set-input of the flip-flop 275. When the disconnection frequency signal $f_2$ for the concerned device 205 arrives at the tuning circuit 274 from the oscillator 264b, the output signal of the circuit 274 is led to the reset-input of the flip-flop 275.

In operation, in the case that the parent device 105 is connected to the child device 205, for example, first of all, the tri-state control input of the transmitter 112 of the RS-422-A I/F becomes low level and non-active, while the tri-state control input of the transmitter 268 becomes high level and active by the signal of the selecting circuit 270. Next, the control signal is sent from the circuit 270 so as to turn the switching circuit 266a on and the other switching circuits 266b-266d off. Thus, the frequency signal $f_1$ of the oscillator 266a is sent from the transmitter 268. Although the above signal $f_1$ arrives at each tuning circuit of the converters 100, 200, and 300, only the tuning circuit 273 tunes in the signal $f_1$, so as to make the set-input of the flip-flop 275 "1". Then, the output of the flip-flop 275 becomes "1" and the electromagnetic relay 261 is energized so as to close the power switch 145. In addition, in the case that the child device 205 is disconnected from the parent device 105, the control signal is sent from the circuit 270 so as to turn the switching circuit 266a off and the switching circuit 266b on. Thus, only the tuning circuit 274 tunes in the signal $f_2$, so as to make the reset-input of the flip-flop 275 "1" and to open the power switch 145. The connection and disconnection of the other device 305 are carried out in the same way as the above. The oscillating circuit 263 and the tuning circuit 271 are one example, and this invention is not limited as the above composition. The number of the child devices is not limited to two as the above, but can increase furthermore.

In the above first to eighth embodiments, although it is shown to convert the prescribed 1st I/F such as the RS-232-C into the 2nd I/F with specifications different from the 1st I/F, such as the RS-422-A, this invention can also apply to interface converters whose electrical specifications, like potential level, physical specifications, like shape of the terminal, arrangement, number, and so on, logical specifications like, combinational logic, sequential logic, and so on, and other specifications differ.

Further, although the numbers of the terminals of the RS-232-C and RS-422-A I/F are designated by the encircled numbers and although outlines of these are given by abbreviations, this invention is not limited to the above embodiments.

As mentioned above, the interface converter of this invention is useful in the case of connecting a plurality of electronic devices with high quality in a multidrop style. Particularly, it is suitable in the case that the number of serial ports is insufficient for the electronic devices and a MODEM cannot be equipped therewith regularly.

I claim:

1. An interface converter for mutually converting data formats between a first serial interface, which transfers digital binary serial data, control signals, and timing signals in data transmission, and a second serial interface with specifications different from the first serial interface, comprising:

- A first connector attached to an interface board of the first serial interface;
- a second connector which has the same terminal arrangement as a first connector, said second connector being connectable directly to said first connector;
- a plurality of third connectors, each of which has a terminal arrangement matched to a connector of the second serial interface;
- a first receiving circuit for the first serial interface being connected to said second connector;
- a first transmitting circuit for the second serial interface interconnecting said first receiving circuit with said third connectors, said first transmitting circuit being controlled by a control line from said second connector via said first receiving circuit;
- a second receiving circuit for the second serial interface being connected to said third connectors, said second receiving circuit being controlled by a control line from said second connector via said first receiving circuit;
- a second transmitting circuit for the first serial interface interconnecting said second receiving circuit with said second connector; and
- a power circuit for powering said first receiving circuit, said first transmitting circuit, said second receiving circuit, and said second transmitting circuit.

2. An interface converter as claimed in claim 1, wherein said second connector includes a transmit-data terminal, a receive-data terminal, a request-to-send terminal, a clear-to-send terminal, a data-set-ready terminal, and a data-terminal-ready terminal, said clear-to-send terminal being connected to said request-to-send terminal, and said data-set-ready terminal being connected to said data-terminal-ready terminal via said first receiving circuit and said second transmitting circuit, respectively.

3. An interface converter as claimed in claim 1, wherein said power circuit has a first power terminal on which a predetermined dc voltage can be impressed from outside the interface converter.

4. An interface converter as claimed in claim 1, wherein said power circuit has a first power terminal on which a predetermined dc voltage can be impressed from outside the interface converter, each of said third connectors having a power terminal connected to said first power terminal.

5. An interface converter as claimed in claim 1, wherein said second connector has a second power terminal connected to a power terminal of said first connector, each of said third connectors having a power terminal connected to said second power terminal is connected.

6. An interface converter as claimed in claim 5, wherein said second power terminal has a power switch.

7. An interface converter as claimed in claim 1, wherein said control line for controlling said first transmitting circuit has a first switch.

8. An interface surface converter as claimed in claim 1, wherein said control line for controlling said second receiving circuit has a second switch.

9. An interface converter as claimed in claim 1, wherein said control line for controlling said first transmitting circuit has a first switch, said control line for controlling said second receiving circuit having a second switch, and said first and second switches forming a single interlocking switch.

10. An interface converter as claimed in claim 1, wherein said control line for controlling said first transmitting circuit has a first switch with a transmitting contact connected to said first transmitting circuit, said control line for controlling said second receiving circuit having a second switch with a receiving contact connected to said second receiving circuit, and said first and second switches forming an interlocking circuit for returning an output of said first transmitting circuit to an output of said second receiving circuit when switching said first and second switches to said transmitting and receiving contacts, respectively, and when being requested to send data from the first serial interface to the second serial interface.

11. An interface converter for mutually converting data formats between a first serial interface, which transfers digital binary serial data, control signals, and timing signals in data transmission, and a second serial interface with specifications different from the first serial interface, comprising:

- A first connector attached to an interface board of the first serial interface;
- a second connector which has the same terminal arrangement as a first connector, said second connector being connectable directly to said first connector;
- a plurality of third connectors, each of which has a terminal arrangement matched to a connector of the second serial interface;
- a first receiving circuit for the first serial interface interconnecting said second connector with a first electro-optical element;
- a first transmitting circuit for the second serial interface interconnecting said third connectors with a first opto-electric element which optically couples said first electro-optical element, said first transmitting circuit being controlled by a control line from said second connector via said first receiving circuit;
- a second receiving circuit for the second signal interface interconnecting said third connectors with a second electro-optical element, said second receiving circuit being controlled by said control line from said second connector circuit;
- a second transmitting circuit for the first serial interface interconnecting said second connector with a second opto-electric element which optically couples said second electro-optical element;
- a first power circuit for powering said first receiving circuit, said second transmitting circuit, said first electro-optical element, and said second opto-electric element;
- a second power circuit for powering said first transmitting circuit, said second receiving circuit, said first opto-electric element, and said second electro-optical element;
- an upper case for enclosing a first board on which said second connector, said first receiving circuit, said first electro-optical element, said second opto-electric element, said second transmitting circuit, and said first power circuit are mounted; and
- a lower case, detachably combined with said upper case, for enclosing a second board on which said first opto-electric element, said first transmitting circuit, said third connectors, said second receiving circuit, said second electro-optical element, and said second power circuit are mounted.

12. An interface converter as claimed in claim 11, wherein each of said first and second power circuits has a power terminal on which a predetermined dc voltage can be impressed from outside the interface converter.

13. An interface apparatus for interconnecting a plurality of child electronic devices with a parent electronic device in a multi-drop-type connection wherein each of said child electronic devices and said parent electronic device has a first serial interface, comprising:
 a plurality of interface converters, each for mutually converting data formats between a first serial interface, which transfers digital binary serial data, control signals, and timing signals in data transmission, and a second serial interface with specifications different from the first serial interface, being attached to said child electronic devices and said parent electronic device, respectively, each having:
 A first connector attached to an interface board of the first serial interface;
 a second connector which has the same terminal arrangement as a first connector, said second connector including a transmit-data terminal, a receive-data terminal, a request-to-send terminal, a clear-to-send terminal, a data-set-ready terminal, and a data-terminal-ready terminal, being connectable directly to said first connector;
 a plurality of third connectors, each of which has a terminal arrangement matched to a connector of the second serial interface, each of said third connectors including a pair of transmit-data terminals and a pair of receive-data terminals;
 a first receiving circuit for the first serial interface being connected to said second connector;
 a first transmitting circuit for the second serial interface interconnecting said first receiving circuit with said third connectors, said first transmitting circuit being controlled by a control line from said clear-to-send terminal of said second connector via said first receiving circuit;
 a second receiving circuit for the second serial interface being connected to said third connectors, said second receiving circuit being controlled by said control line from said clear-to-send terminal of said second connector;
 a second transmitting circuit for the first serial interface interconnecting said second receiving circuit with said second connector; and
 a power circuit for powering said first receiving circuit, said first transmitting circuit, said second receiving circuit, and said second transmitting circuit;
 a plurality of cables, each for interconnecting one of said third connectors of the interface converter attached to said parent electronic device or one of said child electronic devices with one of said third connectors of another interface converter attached to another child electronic device; and
 a plurality of terminating resistors, each for forming a closed circuit by interconnecting the pair of transmit-data terminals or the pair of receive-data terminals of the third connectors of said terminal child electronic device.

14. An interface apparatus for interconnecting a plurality of child electronic devices with a parent electronic device in a multi-drop-type connection wherein each of said child electronic devices and said parent electronic device has a first serial interface, comprising:
 a plurality of interface converters, each for mutually converting data formats between a first serial interface, which transfers digital binary serial data, control signals, and timing signals in data transmission, and a second serial interface with specifications different from the first serial interface, being attached to said child electronic devices and said parent electronic device, respectively, each having:
 A first connector attached to an interface board of the first serial interface;
 a second connector which has the same terminal arrangement as a first connector, said second connector including a transmit-data terminal, a receive-data terminal, a request-to-send terminal, a clear-to-send terminal, a data-set-ready terminal, and a data-terminal-ready terminal, being connectable directly to said first connector;
 a plurality of third connectors, each of which has a terminal arrangement matched to a connector of the second serial interface, each of said third connectors including a pair of transmit-data terminals, a pair of receive-data terminals, and a power terminal;
 a first receiving circuit for the first serial interface being connected to said second connector;
 a first transmitting circuit for the second serial interface interconnecting said first receiving circuit with said third connectors, said first transmitting circuit being controlled by a control line from said clear-to-send terminal of said second connector via said first receiving circuit;
 a second receiving circuit for the second serial interface being connected to said third connectors, said second receiving circuit being controlled by said control line from said clear-to-send terminal;
 a second transmitting circuit for the first serial interface interconnecting said second receiving circuit with said second connector;
 a power circuit for powering said first receiving circuit, said first transmitting circuit, said second receiving circuit, and said second transmitting circuit, having said power terminal;
 a plurality of cables, each interconnecting one of said third connectors of the interface converter attached to said parent electronic device or one of said child electronic devices with one of said third connectors of another interface converter attached to another child electronic device;
 one or more power supply units for powering said power circuit via said power terminal, each of which is provided midway in said cable, being fewer than the interface converters.

15. An interface apparatus as claimed in claim 14, wherein said power terminal of the interface converter attached to said child electronic device has a power switch, a remote switch controlled by said parent electronic device being connected in parallel to said power switch.

16. An interface apparatus as claimed in claim 15, wherein said remote switch is an electromagnetic relay.

17. An interface apparatus as claimed in claim 15, wherein said remote switch is a photocoupler.

18. An interface apparatus as claimed in claim 14, wherein said power terminal of the interface converter attached to each of said child electronic devices has a power switch, a remote switch being connected in parallel to said power switch, said parent electronic device having a selecting circuit for selecting one or more said child devices by controlling said remote switch.

19. An interface apparatus as claimed in claim 14, wherein said parent electronic device has an oscillating circuit in which a plurality of particular frequencies are assigned to said child electronic devices, respectively, an output of which is connected to said transmit-data terminals of said third connector of the interface converter attached thereto, having a selector circuit which selects either for selecting one or more said child electronic devices by assigning one or more of said particular frequencies in said oscillating circuit, interface apparatus attached to each of said child electronic devices having circuit means for controlling said remote switch, an input of which is connected to said transmit-data terminals and which control said remote switch when the particular frequency signal assigned to the concerned child device.

* * * * *